(12) United States Patent
Khalid

(10) Patent No.: US 11,160,043 B2
(45) Date of Patent: Oct. 26, 2021

(54) METHODS AND APPARATUS FOR DISTRIBUTING TIMING INFORMATION

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 17 days.

(21) Appl. No.: 16/829,702

(22) Filed: Mar. 25, 2020

(65) Prior Publication Data

US 2021/0306965 A1    Sep. 30, 2021

(51) Int. Cl.
*H04W 56/00* (2009.01)
*H04W 24/10* (2009.01)
*H04W 4/06* (2009.01)

(52) U.S. Cl.
CPC ......... *H04W 56/0015* (2013.01); *H04W 4/06* (2013.01); *H04W 24/10* (2013.01)

(58) Field of Classification Search
CPC .... H04W 56/0015; H04W 4/06; H04W 24/10
See application file for complete search history.

(56) References Cited

U.S. PATENT DOCUMENTS

| 9,088,390 B1* | 7/2015 | Wheelock | H04N 21/6118 |
| 2013/0034197 A1* | 2/2013 | Aweya | H03L 7/0991 |
| | | | 375/362 |
| 2016/0112182 A1* | 4/2016 | Karnes | G06F 1/14 |
| | | | 375/362 |
| 2020/0267673 A1* | 8/2020 | Joseph | H04W 56/001 |

* cited by examiner

*Primary Examiner* — Joshua L Schwartz
(74) *Attorney, Agent, or Firm* — Straub & Straub; Michael P. Straub; Stephen T. Straub

(57) ABSTRACT

Devices including a wireless receiver, e.g., indoor CBSDs, in a local network, e.g. a campus network, monitor for wireless signals conveying synchronization information. Different devices in the local area network may detect wireless signals conveying synchronization information from one or more different sources. A device detecting a source of synchronization information generates and sends a timing signal accuracy report to a switch, e.g. an intelligent IDF switch, included in the local network. The switch receives multiple timing signal accuracy reports, selects a "best" sync source and designates the particular device, e.g., particular CBSD, which reported the best sync source, to be the current master timing device for the local network. The switch communicates the address, e.g., IP address, of the selected master to the devices within the local network.

20 Claims, 27 Drawing Sheets

TRADITIONAL APPROACH IN SYNCHRONIZATION OF IN-BUILDING TD LTE CBRS RADIOS

| FIGURE 15A |
| FIGURE 15B |
| FIGURE 15C |
| FIGURE 15D |

METHODS AND APPARATUS FOR DISTRIBUTING TIMING INFORMATION

FIELD

The invention relates to communications networks, and more particularly, to method and apparatus for obtaining, e.g., via wireless signals, and distributing accurate synchronization information for a campus network, e.g. a Citizens Broadband Radio Services (CBRS) campus network.

BACKGROUND

Citizens Broadband Radio Services Time Division Long Term Evolution (CBRS TD LTE) radios need GPS or Clock Sync signal such as IEEE 1588 for frequency, phase and Time of Day (ToD). GPS signals are usually not strong enough inside building/basements or even near high rise building to be able to successfully recover frequency, phase and Time of Day (ToD). Traditionally, indoor CBRS TD-LTE radios are synchronized using a GrandMaster and a boundary clock approach as shown in FIG. 1.

Drawing 100 of FIG. 1 illustrates a traditional approach for synchronization used for indoor CBRS RD-LTE radios. FIG. 1 includes a GPS unit 104, including a GPS receive antenna and GPS receiver, which is coupled to a timing sync server 102, which is coupled to an Ethernet switch 106. Ethernet switch 106 is coupled to a Main Distribution Frame (MDF) 110 in building 108. Building 108 includes MDF 110, which is coupled to a plurality of Intermediate Distribution Frames (IDFs) (IDF 1 112 for floor 1, IDF 2 114 for floor 2, IDF 3 115 for floor 3, . . . , IDF N 116 for floor N.) Each IDF is coupled to a plurality of Citizens Broadband radio Services Devices (CBSDs). Drawing 200 of FIG. 2 shows a typical floor deployment, e.g., corresponding to any of the floors in building 109 of FIG. 1, in which a plurality of exemplary CBSDs (CBSD 1 204, CBSD 2 202, CBSD 3 208, CBSD 4 210, . . . , CBSD 5 212) are coupled to an exemplary IDF switch 202.

More specifically, with regard to FIG. 1, IDF 1 112 is coupled to CBSDs (CBSD11 118, CBSD12 120, CBSD13 122, CBSD14 124, . . . , CBSD1M 126), as shown in FIG. 1. IDF 2 114 is coupled to CBSDs (CBSD21 128, CBSD22 130, CBSD23 132, CBSD24 134, . . . , CBSD2M 136), as shown in FIG. 1. IDF 3 115 is coupled to CBSDs (CBSD31 138, CBSD32 140, CBSD33 142, CBSD34 144, . . . , CBSD3M 146), as shown in FIG. 1. IDF N 116 is coupled to CBSDs (CBSDN1 148, CBSDN2 150, CBSDN3 152, CBSDN4 154, . . . , CBSDNM 156), as shown in FIG. 1.

Synchronization information obtained from satellites, via GPS unit 104, is relayed to Citizen Broadband radio Services Devices (CBSDs) (118, 120, 122, 124, 126, 128, 130, 132, 134, 136, 138, 140, 142, 144, 146, 148, 150, 152, 154, 156) using the time sync server 102. Indoor CBSDs (118, 120, 122, 124, 126, 128, 130, 132, 134, 136, 138, 140, 142, 144, 146, 148, 150, 152, 154, 156) are configured with the Clock server's IP address (IP address of time sync server 102) to obtain synchronization information. This traditional approach, which uses a GPS receiver and a time sync server at each building site, can be costly. For example, the traditional approach can be relatively expensive, e.g., $25,000-30,000 per site, for the purchase and installation of the GPS receiver, GPS antenna, cabling, and time sync server.

Based on the above discussion there is a need for new methods and apparatus to provide synchronization information to networks, e.g. to a TDD based CBRS campus network, e.g., a proprietary CBRS local Area network (LAN) or set of interconnected LANs serving a corporation, government agency, university, or similar organization.

SUMMARY

Methods and apparatus for sync over the air for a campus network, e.g., a TDD based CBRS campus network, are described. This approach eliminates the expensive hardware, e.g., GPS receiver, GPS antenna, and time synchronization server, typically used by a campus network for obtaining and distributing accurate synchronization information.

Devices, e.g., indoor CBSDs, in a local network, e.g. a campus network, monitor for wireless signals conveying synchronization information. Different devices in the local area network may detect wireless signals conveying synchronization information from one or more different sources. A device detecting a source of synchronization information generates and sends a timing signal accuracy report to a switch, e.g. an intelligent IDF switch, included in the local network. The switch receives multiple timing signal accuracy reports, selects a "best" sync source and designates particular device, e.g., particular CBSD, which reported the best sync source, to be the current master timing device for the local network. The switch communicates the address, e.g., IP address, of the selected master to the devices within the local network. The selected master device for the local network continues to receive wireless signals conveying sync information, and generates and sends messages conveying sync information, e.g. propagating synchronization information, to other devices, e.g. slave devices, in the local network.

An exemplary method for providing access to timing information, in accordance with some embodiments, comprises: operating a switch, e.g., an Intermediate Distribution Frame (IDF) switch included in a campus network, to receive a plurality of timing signal accuracy reports, from a plurality of wireless devices, the plurality of timing signal accuracy reports including a first timing signal accuracy report sent from a first wireless device and a second timing signal accuracy report sent from a second wireless device; operating the switch to select one of the wireless devices from which a timing signal accuracy report was received to act as a timing signal master device; and operating the switch to communicate an address, e.g., IP address, of the timing signal master device to devices which use timing synchronization information.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

DETAILED DESCRIPTION

CBRS is a tiered solution with top tier dedicated for fixed satellite, Wireless internet service providers (WISP) as well as navy radar. The second tier consists of Priority Access Licenses (PAL) and the last tier consists of General Authorized Access (GAA).

Figure 1:
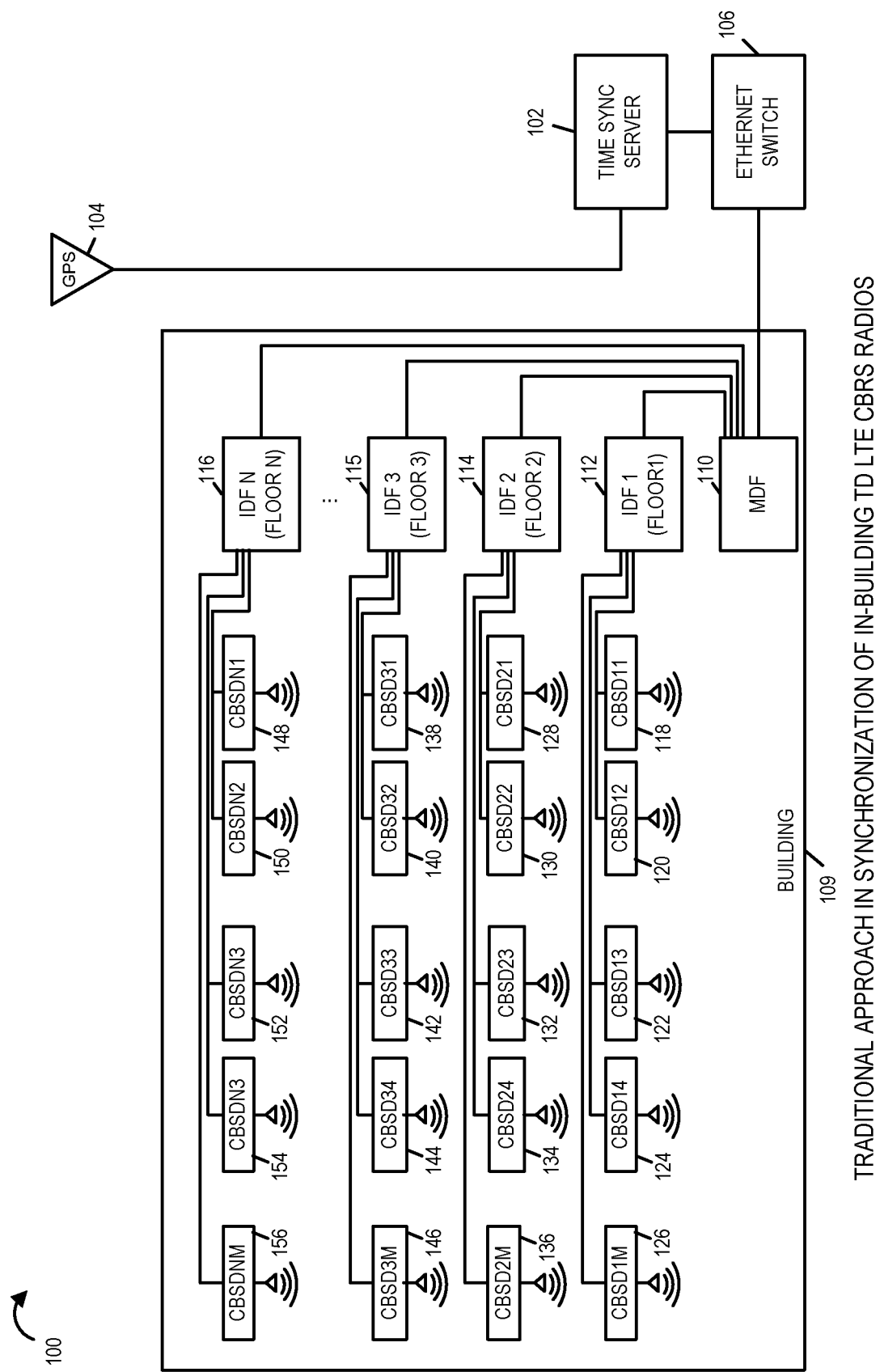
FIG. 1 illustrates a traditional approach for synchronization used for indoor CBRS RD-LTE radios.
Figure 2:
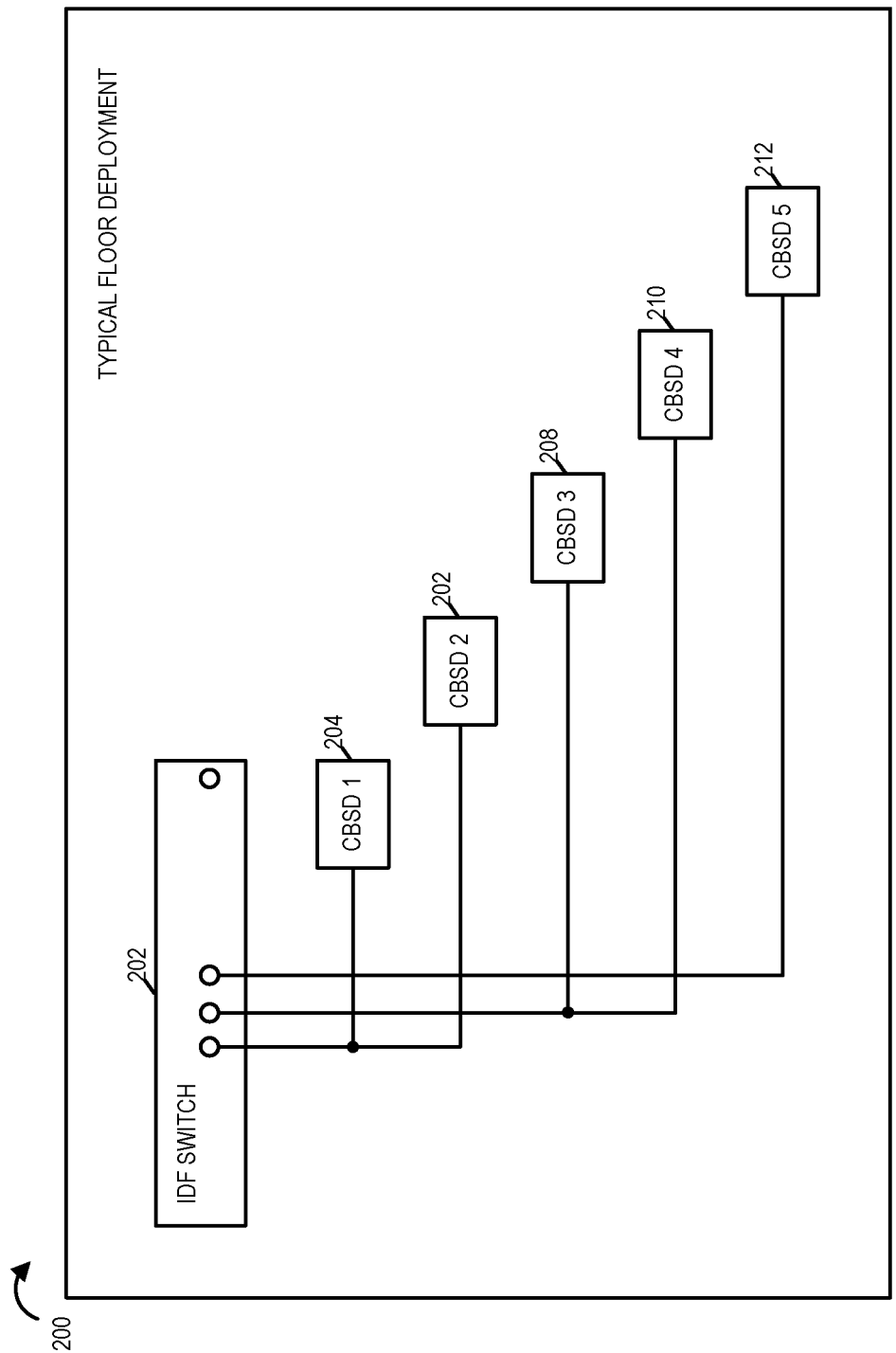
FIG. 2 illustrates a typical floor deployment including a plurality of indoor CBSDs coupled to an Intermediate Distribution Frame (IDF) switch.
Figure 3:
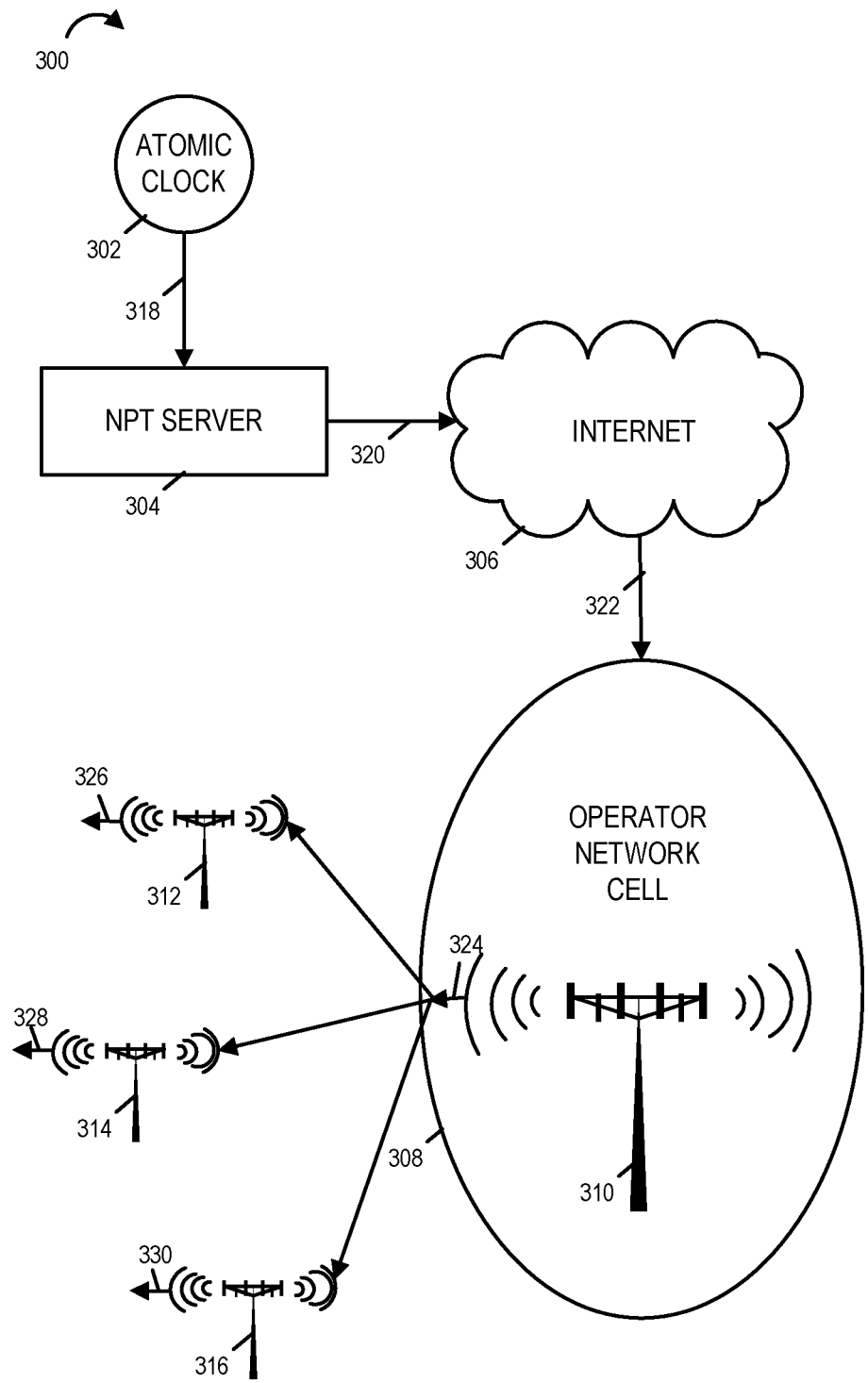
FIG. 3 is a drawing illustrating an operator distributing a clock signal for synchronization in accordance with an exemplary embodiment.

Generally, operators distribute the clock signal for synchronization as shown in drawing 300 of FIG. 3. Drawing 300 includes an atomic clock 302, a Network Time Protocol (NPT) server 304, Internet 306, a first operator's network cell 308 including a CBRS base station 310 and a plurality of additional CBRS base stations corresponding to the first operator. Atomic clock 302 generates and sends atomic clock signal 318 to NPT server 304. Network Time Protocol (NPT) server 306 receives atomic clock signals 318, generates NPT signals 320 conveying atomic clock information, and sends the generated NPT signals 320, via Internet 306, toward CBRS base station 310 of operator network 310. CBRS base station 310 receives signals 322, which communicates the synchronization information of NPT signals 320. CBRS base station 310 broadcasts wireless signals 324 conveying timing synchronization information based on the timing synchronization information included in received signals 322. Other CBRS base stations (312, 314, 316) of the first operator network may receive signals 324 and generate and broadcast additional wireless signals (324, 326, 328) conveying the timing synchronization information. Thus atomic clock signals are distributed using NPT over the Internet which can be reused by other cells of the same operator listening to the network.

A given CBRS device, e.g., an indoor CBSD situated near the exterior of the building, can listen to one or more CBRS networks and obtain sync information from an operator (e.g., a CBRS operator's base station) also operating in CBRS. In some embodiments, this sync information is embedded in Master Information Block (MIB) in the form of Primary Synchronization Signals (PSS) and Secondary Synchronization Signals (SSS) which is continuously broadcast.

Figure 4:
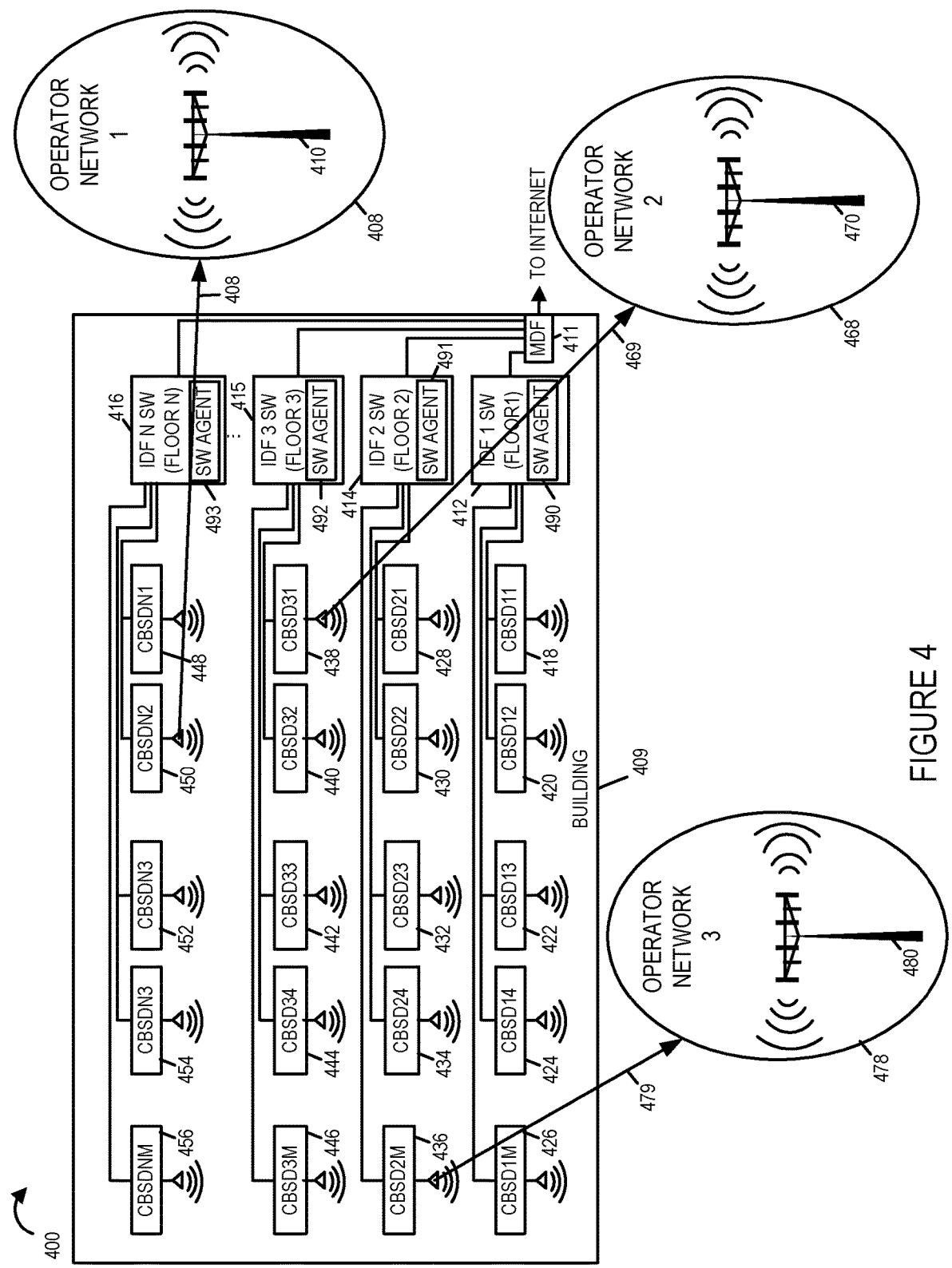
FIG. 4 illustrates CBSDs in a campus CBRS network corresponding to a building, listening for timing synchronization information, and different CBSDs in the campus CBRS network successfully acquiring timing synchronization information from different operators in accordance with an exemplary embodiment.

In some embodiments, there may be, and sometimes are, multiple sources of synchronization in the vicinity of a CBRS network, e.g. a CBRS campus network corresponding to a building. Different devices in the CBRS network, e.g., CBRS campus network corresponding to the building, may find different sources of synchronization. FIG. 4 is a drawing 400 illustrating an example in which there are different sources of synchronization in the vicinity of a campus CBRS network corresponding to building 409, and different CBSD devices in the CBRS campus network are able to find the different sources of synchronization.

Figure 5:
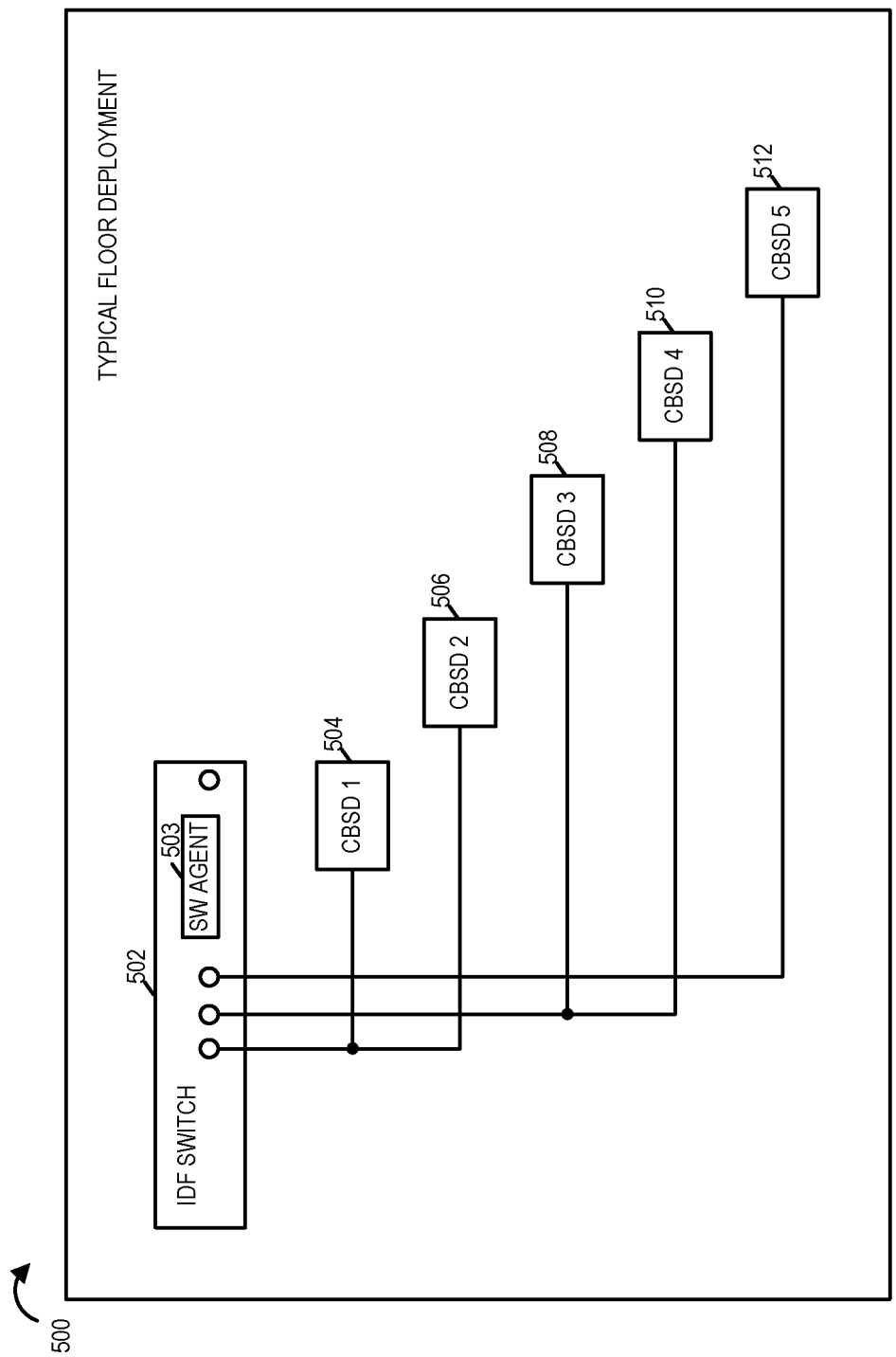
FIG. 5 illustrates a typical floor deployment corresponding to the example of FIG. 4 including a plurality of indoor CBSDs coupled to an Intermediate Distribution Frame (IDF) switch, said IDF switch including a software agent on the switch which collects acquired timing synchronization information acquired from CBSDs and/or selects a master timing source to be used by the campus network in accordance with an exemplary embodiment.

The campus CBRS network of building 409 includes Main Distribution Frame (MDF) 411, which is coupled to a plurality of Intermediate Distribution Frame (IDF) switches (IDF switch 1 412 including software agent 490 for floor 1, IDF switch 2 214 including software agent 491 for floor 2, IDF switch 3 415 including software agent 492 for floor 3, . . . , IDF switch N 416 including software agent 493 for floor N.) Each IDF switch is coupled to a plurality of Citizens Broadband radio Services Devices (CBSDs). Drawing 500 of FIG. 5 shows a typical floor deployment, e.g., corresponding to any of the floors in building 409 of FIG. 4, in which a plurality of exemplary CBSDs (CBSD 1 504, CBSD 2 502, CBSD 3 508, CBSD 4 510, . . . , CBSD 5 512) are coupled to an exemplary IDF switch 502. Exemplary IDF switch 502 includes a software agent 503.

More specifically, with regard to FIG. 4, IDF switch 1 412 is coupled to CBSDs (CBSD11 418, CBSD12 420, CBSD13 422, CBSD14 424, . . . , CBSD1M 426). IDF switch 2 414 is coupled to CBSDs (CBSD21 428, CBSD22 430, CBSD23 432, CBSD24 434, . . . , CBSD2M 436), as shown in FIG. 4. IDF switch 3 415 is coupled to CBSDs (CBSD31 438, CBSD32 440, CBSD33 442, CBSD34 444, . . . , CBSD3M 446), as shown in FIG. 4. IDF switch N 416 is coupled to CBSDs (CBSDN1 448, CBSDN2 450, CBSDN3 452, CBSDN4 454, . . . , CBSDNM 456), as shown in FIG. 4.

CBRS base station 410, which is part of operator network 1408, transmits timing synchronization information, which is received and recovered by CBSDN2 450. Thus CBSDN2 450 has acquired timing synchronization information from the transmission of CBRS base station 410 of operator network 1408, as indicated by arrow 409.

CBRS base station 470, which is part of operator network 2 468, transmits timing synchronization information, which is received and recovered by CBSD31 438. Thus CBSD31 438 has acquired timing synchronization information from the transmission of CBRS base station 470 of operator network 2 468, as indicated by arrow 469.

CBRS base station 480, which is part of operator network 3 478, transmits timing synchronization information, which is received and recovered by CBSD2M 436. Thus CBSD2*m* 436 has acquired timing synchronization information from the transmission of CBRS base station 480 of operator network 3 478, as indicated by arrow 469.

In some embodiments, each of the CBSDs in the campus CBRS network of FIG. 4, attempt to acquire, e.g. monitor for, timing synchronization signals. A CBSD, which is able to acquire a timing synchronization signal, such as CBSDs (450, 438, 436), generates and sends a message to a software agent, operating on an IDF, communicating the acquired timing information. One of the software agents (490, 491, 492 493) or multiple software agents operating in coordination, compares candidate timing sources, and selects a single source of timing synchronization information, e.g., the best timing sources, from among the detected candidate timing sources, to be used by the campus CBRS network. The CBSD which detected the selected timing source is notified that it is to operate as the master timing source, and the other CBSDs in the campus CBRS network are notified that they are to operate a slaves and are provided the IP address of the selected CBSD which is to be the master.

In a case in which CBRS operator networks are not available to provide timing synchronization information to the CBSDs in the campus CBRS network, another source of timing synchronization information may be used. For example, if some or all of the CBSDs in the campus CBRS network are dual frequency capable, for example, CBSD+ WiFi, synchronization information can be, and sometimes is, obtained from a WiFi band.

In some embodiments, CBSDs, e.g., in a campus network, which are seeking timing synchronization information from outside sources communicated via wireless signals, scan the CBRS spectrum in the following order: i) Priority Access License (PAL), ii) General Authorized Access (GAA) and iii) Wireless Internet Service Providers (WISP).

Figure 6:
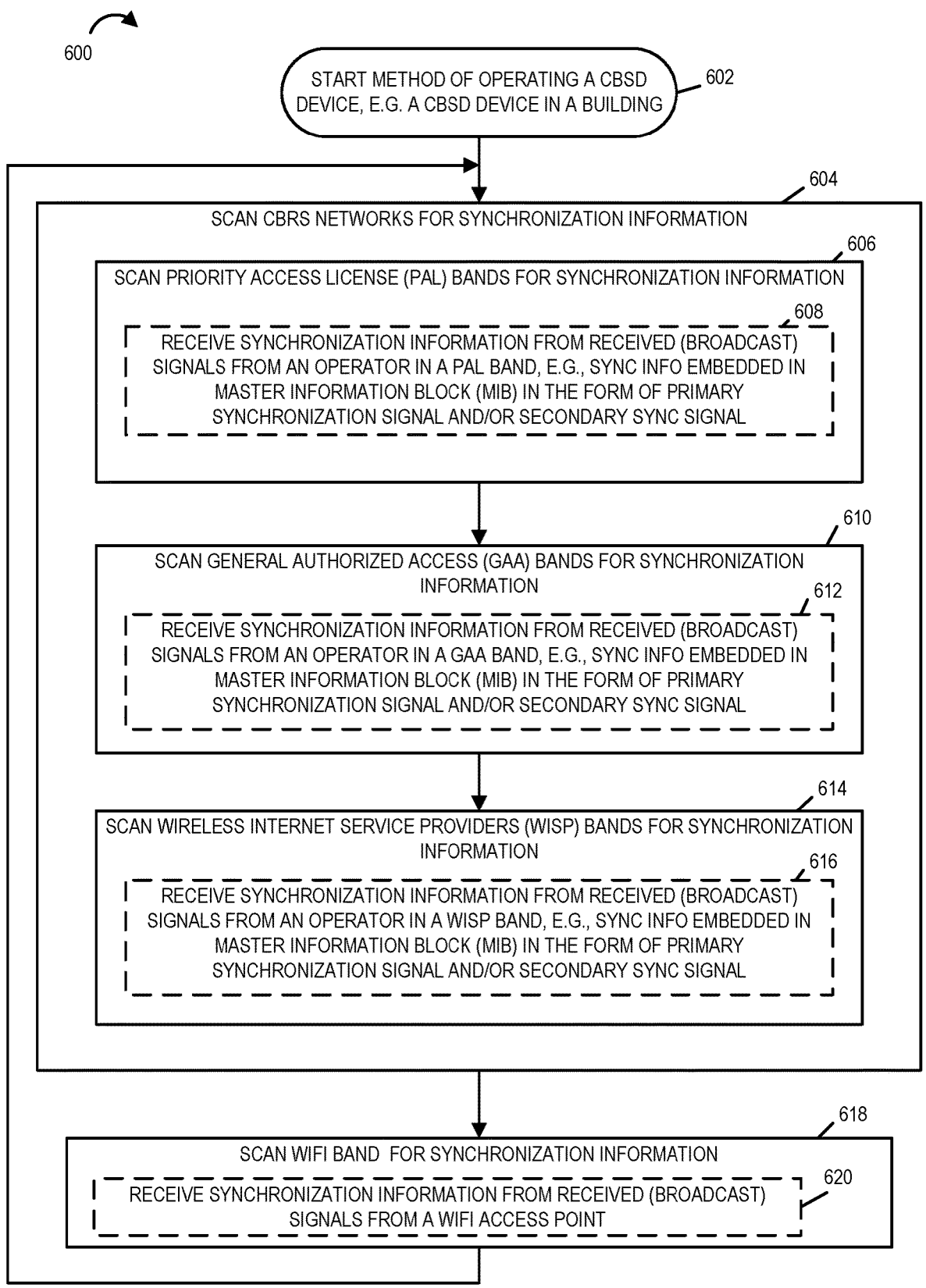
FIG. 6 is a flowchart of an exemplary method of operating a CBSD, e.g., in a campus CBRS network, to attempt to acquire timing synchronization information, e.g., by scanning CRBS band(s) and/or WiFi bands, in accordance with an exemplary embodiment.

FIG. 6 is a flowchart 600 of an exemplary method of operating a CBSD, e.g., in a campus CBRS network, to attempt to acquire timing synchronization information from wireless signals, e.g., by scanning CRBS band(s) and/or WiFi band(s), in accordance with an exemplary embodiment.

Operation of the exemplary method to acquire synchronization information from wireless signals starts in step 602, in which a CBSD, e.g., a CBSD in a campus network, e.g., an indoor CBSD in a building, is powered on and initialized. Operation proceeds from step 602 to step 604. In step 604 the CBSD scans CBRS networks for synchronization information. Step 604 includes step 604, 606 and step 608. In step 606 the CBSD scans priority license access (PAL) bands for synchronization information. Step 606 may, and sometimes does, include step 608, in which the CBSD receives synchronization information from received (broadcast) signals from an operator in a PAL band. For example, in step 608 the CSBD receives broadcasts signals (conveying synchronization information) in a PAL band from an outdoor base station, e.g., an eNB, corresponding to a ISP, which is licensed to use the PAL band, said received broadcast signals including a primary synchronization signal and/or a secondary synchronization signal, e.g., with synchronization information embedded in a master information block (MIB). Operation proceeds from step 606 to step 610.

In step 610 the CBSD scans General Authorized Access bands (GAA) bands for synchronization information. Step 610 may, and sometimes does, include step 612, in which the CBSD receives synchronization information from received (broadcast) signals from an operator in a GAA band. For example, in step 610 the CSBD receives broadcasts signals (conveying synchronization information) in a GAA band from an outdoor gateway, e.g. an Internet of Things (IoT) GW or Long Range Wide Area Network (LoRaWAN) GW, using a GAA band, said received broadcast signals including a primary synchronization signal and/or a secondary synchronization signal, e.g., with synchronization information embedded in a master information block (MIB). Operation proceeds from step 610 to step 614.

In step 614 the CBSD scans Wireless Internet Service Provider (WISP) bands for synchronization information. Step 614 may, and sometimes does, include step 616, in which the CBSD receives synchronization information from received (broadcast) signals from an operator in a WISP band. For example, in step 614 the CSBD receives broadcasts signals (conveying synchronization information) in a WISP band from an outdoor base station, e.g., an eNB, corresponding to a ISP, which is allowed to use the WISP band, said received broadcast signals including a primary synchronization signal and/or a secondary synchronization signal, e.g., with synchronization information embedded in a master information block (MIB). Operation proceeds from step 604 to step 618.

In step 618 the CBSD scans one or more WiFi bands for synchronization information. Step 618 may, and sometimes does, include step 620, in which the CBSD receives synchronization information from the received (broadcast) signals from a WiFi access point. Operation proceeds from step 618 to the input of step 604, e.g., for another set of scans at a later point in time.

In some embodiments, the CBSD includes two wireless receivers and steps 604 and 606 can be, and sometimes are, performed in parallel.

A CBSD, which detected one or more sync sources, via the scanning of the method of flowchart 600, generates and sends a sync accuracy report, e.g., reporting frequency sync accuracy, phase sync accuracy and timing sync accuracy (e.g., for each detected sync source or for the detected sync source that it considers to be best) to a switch, e.g. an IDF switch including a SW agent.

A software agent, e.g., SW agent 490, running an algorithm on an IDF switch, e.g., IDF switch 490, receives messages from the CBSDs communicating timing synchronization information, from the CBSDs which successfully received timing synchronization information, (e.g. CBSDs 450, 438, 436) compares phase, frequency and timing accuracy in tabular form along with protocol source. The SW agent selects a "best" sync source for the campus network, e.g., in accordance with a predetermined selection method, identifies a master CBSD (to be used to supply sync information to other devices in the campus network), notifies the selected master that it has been selected, and communicates the address, e.g., IP address, of the selected master to the other devices, e.g., other CBSDs (slave CBSDs) in the campus network.

Figure 7:
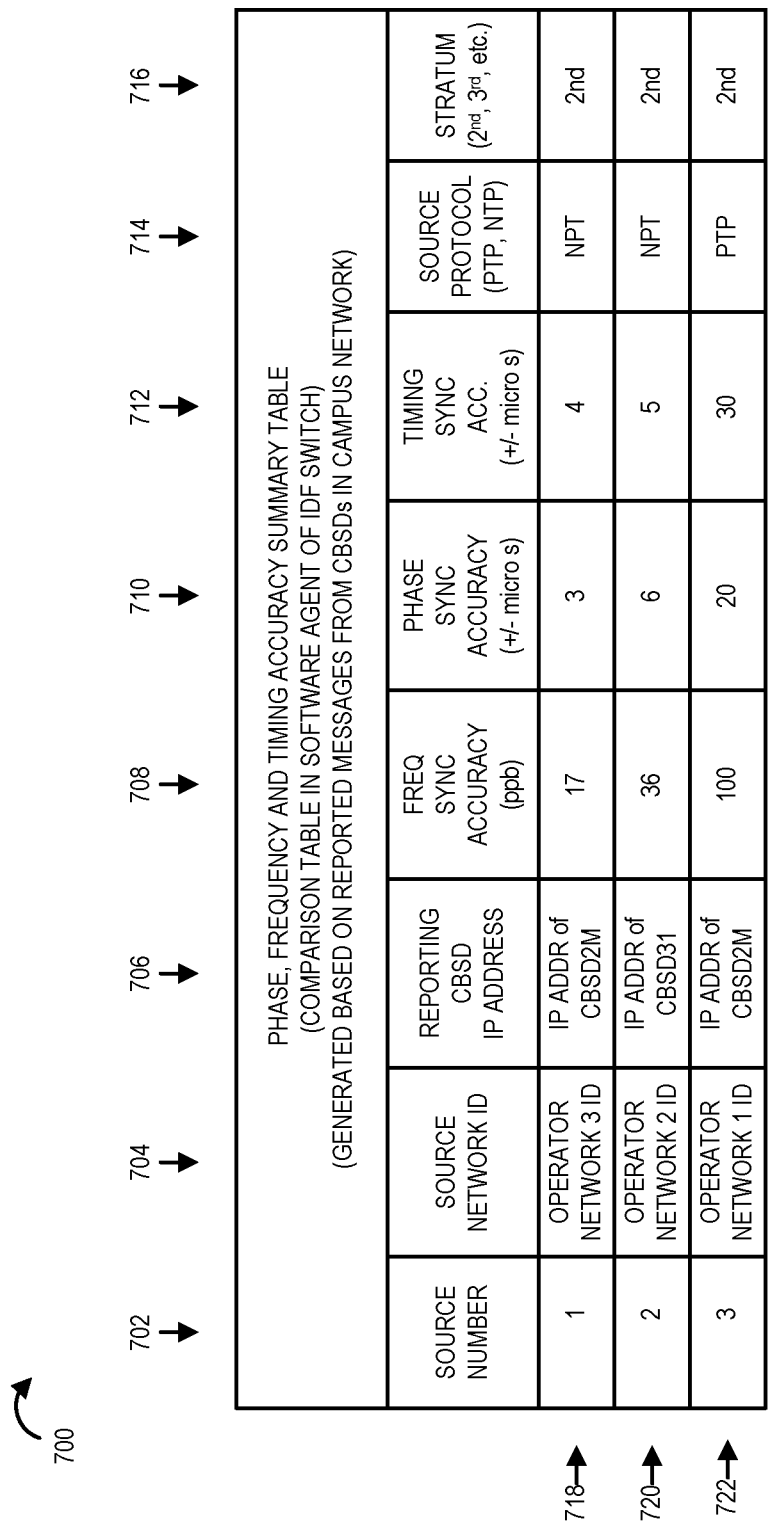
FIG. 7 is a drawing of an exemplary table illustrating exemplary received synchronization information corresponding to the three candidate sources corresponding to the example of FIG. 4.

FIG. 7 is a drawing of an exemplary table 700 illustrating exemplary received synchronization information corresponding to the three candidate sources corresponding to the example of FIG. 4. Table 700 is a phase, frequency and timing accuracy summary table, which is a comparison table in a software agent of an IDF switch. Table 700 is populated based on information from reported messages from CBSDs in the campus network. First column 702 includes source number. Second column 704 includes source network ID information. Third column 706 includes reporting CBSD IP address information. Fourth column 708 includes frequency sync accuracy in ppb. Fifth column 710 includes phase sync accuracy information in +/- micro seconds. Sixth column include timing sync accuracy in +/- micro seconds. Sixth column 714 identifies the source protocol, one of Precision Time Protocol (PTP) or Network Time Protocol (NTP). Seventh column 716 identifies the stratum for the sync information, e.g., 2nd, 3rd, etc.

In some embodiments, a CBSD may detect multiple alternative sources of synchronization information, generate a report, e.g., a timing signal accuracy report including a set of accuracy information corresponding to each of the detected multiple alternative sources of synchronization information, and send the generated report to the IDF switch. Thus in some embodiments an accuracy report summary table, such as table 700, may, and sometimes does, include multiple rows corresponding to a received accuracy report from a CBSD.

First row 718 includes a set of information for source 1 (first received candidate source for synchronization). Second row 720 includes a set of information for source 2 (second received candidate source for synchronization). Third row 722 includes a set of information for source 3 (third received candidate source for synchronization). In this example, the software agent on the IDF switch selects source 1 as the best source for synchronization information, e.g., source 1 has the highest sync accuracy (lowest reported error value), and highest phase accuracy (lowest reported phase accuracy error value) and highest timing sync accuracy (lowest reported error value) among the 3 candidate sources. Thus CBSD2M 436 is selected, by the software agent on the IDF switch, as the device to be the master device with regard to supplying synchronization information to the campus network. The software agent notifies CBSD2M 436 that it is to be the master, and notifies the other CBSDs in the campus network that they are to be slave devices with regard to synchronization and sends the IP address of the master which is the IP address of CBSD2M 436 to each of the slave CBSDs in the campus network of FIG. 4.

Each of the CBSDs, e.g., in the campus network of FIG. 4, listening to different networks, should be synchronized to one source to avoid collisions an inaccurate transmission which will result in capacity reduction and poor hand over key performance indicators (KPIs).

The CBSD receiving the best accurate information, which in this example is CBSD2M 436, is designed Master clock source for the campus network. Each of the other CBSDs in the campus network are configured as slaves and are to obtain their clock source from the master. Slave CBSD units are configured with an IP address of the Master CBSD (e.g., IP address of CBSD2M 436) to obtain clock synchronization.

Details of how sync information can be, and sometimes is, broadcasted, e.g., by a CBRS base station of an operator service provider, will now be described. This synchronization information can be transmitted over the air using various means, for example by broadcasting over a broadcast channel or a server for authorized devices, e.g. authorized CBSDs.

CSBSs can be, and sometimes are, subscribers of a service, e.g., an LTE service providing synchronization information. A sync service can be, and sometimes is, provided, e.g., to CBSDs, using packetized data over an evolved Multimedia Broadcast Multicast Services (eMBMS) service.

Figure 8:
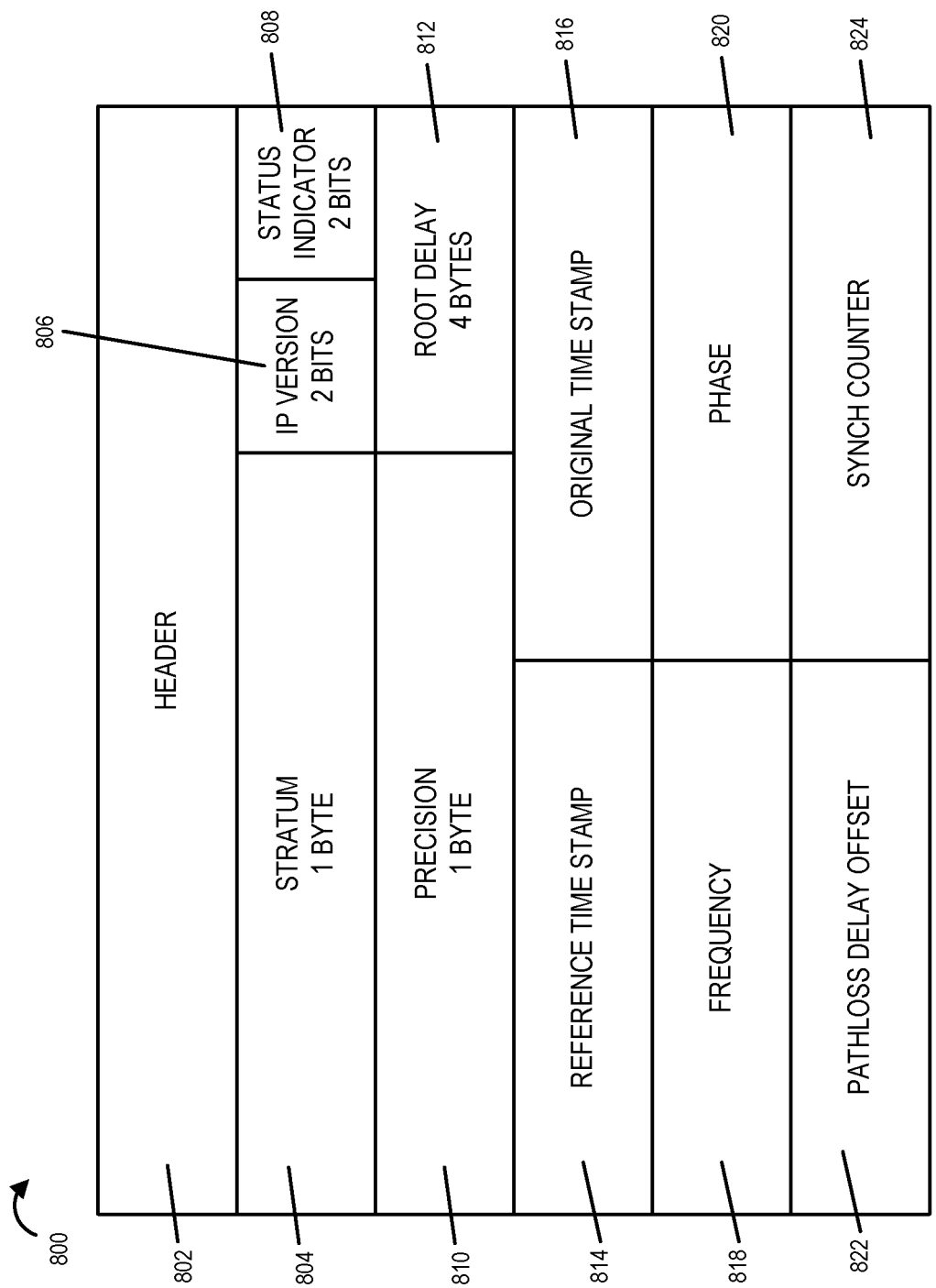
FIG. 8 shows exemplary an exemplary packet including data to be shared for providing the sync service using eMBMS in accordance with some embodiments.

FIG. 8 shows exemplary an exemplary packet 800 including data to be shared for providing the sync service using eMBMS in accordance with some embodiments. FIG. 8 illustrates an exemplary packet format for an exemplary conveying synchronization information, e.g., included in a Synch message flow as part of IP Multicast.

Exemplary Sync Packet 800 includes a header field 802, a stratum field 804 (e.g., 1 byte), an IP version field 808 (e.g., 2 bits), a status indicator field 808, e.g., 2 bits, a precision field 810 (e.g., 1 byte), a root delay field 812 (e.g., 4 bytes), a reference time stamp field 814, an original time stamp field 816, a frequency field 818, a phase field 820, a path loss delay offset field 822 and a synch counter field 824. The stratum field 802 indicates a level of stratum, e.g., primary, secondary, etc. The IP version field 808 indicates the IP version, e.g., IPv4 or IPv6. The status indicator field indicates the status: clock synchronized or not synchronized. Precision field 810 communicates the precision of the local clock, e.g. in a power of 2. Root delay field 812 communicates round trip time delay to the primary source. Time stamp is the time at which the request departed the client for the CBSD. Path loss delay offset, communicated in pathloss delay offset field 822 is obtained from channel state information (CSI) which helps in estimating path loss and estimating time delay to reach a device. Synch counter, communicated in sync counter field 824, is decremented each time this information is received from another CBSD. For example, a peer to peer establishment of connectivity to share synch information between primary recipient if the synch information, i.e., a primary CBSD, will decrement sync counter before forwarding it the second CBSD, and so forth and so on. The purpose of using the synch counter and decrementing before forwarding to the next hop is to limit the number of hops as the time sensitive information may, and sometimes does, actually become inaccurate due to unexpected path loss delays.

Each of the exemplary fields in exemplary sync packet 800 will now be described in more detail.

Header field 802: The header field includes information such as source, destination, type of packet, length of the packet, Frame check sequence for error detection, etc. An example of a header field value will be fairly similar to a MAC header, where destination, source address is given in hex.

Stratum field 804: The stratum field communicates clock level. For example, the value of the stratum communicates one of: primary, secondary (source code for secondary), etc. The value of the stratus is, e.g., a value in the range of 0-255 in decimal.

IP version field 806: The IP version field uses 2 bits for communicating the IP version, e.g., Internet Protocol version 4 (IPv4) or Internet Protocol version 6 (IPv6). For example, a value if 00 in the IO version field communicates IPv4 and a value of 01 in the IP version field communicates IPv6.

Stratus indicator field 810: The stratus indicator field communicates the Stratus indicator: clock synchronized or not synchronized. For example, stratus indicator field value of 00 indicates not synced and a stratus indicator field value of 01 indicates synced, and other values are reserved.

Precision field 812: The precision field communicates the precision of the clock in powers of 2. For example a precision field value of 00000001 would represent 2^1 and so and so forth.

Root delay field 812: The root delay field communicates round trip delay to the primary source.

Reference Time stamp 814: The reference time stamp communicates the time at which the request departed the client for the CBSD.

Original Time Stamp field 816: The original time stamp field communicates a Time stamp originally provided by the source.

Pathloss delay offset field 822: The pathloss delay offset communicated in the pathloss delay offset field is obtained from (channel state information) CSI information which helps in estimating pathloss and estimate time delay to reach a device.

Synch counter field 824: The synch counter field communicates a synch counter which is decremented each time this information is received from another CBSD. For example, in some embodiments in which, a peer to peer establishment of connectivity is used to share synch information between a primary recipient of synch information i.e., a primary CBSD, i.e. CBSD 1, and a secondary CBSD, i.e. CBSD 2, the primary CBSD, i.e., CBSD 1, will decrement the synch counter before forwarding it to the secondary CBSD i.e., CBSD 2, and so on so forth. The purpose of doing this is to limit the number of hops as the time sensitive information may actually, become inaccurate do to unexpected pathloss delays. In one exemplary embodiment a one-byte synch counter field is used to communicate a value in the range 00000000-11111111 (0-255 in decimal). Similarly, in some other embodiments, higher byte fields can be mapped to other numbers that could represent different ways.

Frequency field 818: The frequency field communicates frequency of oscillations.

Phase field 820: The phase field communicates the phase of oscillator/wave.

Figure 9:
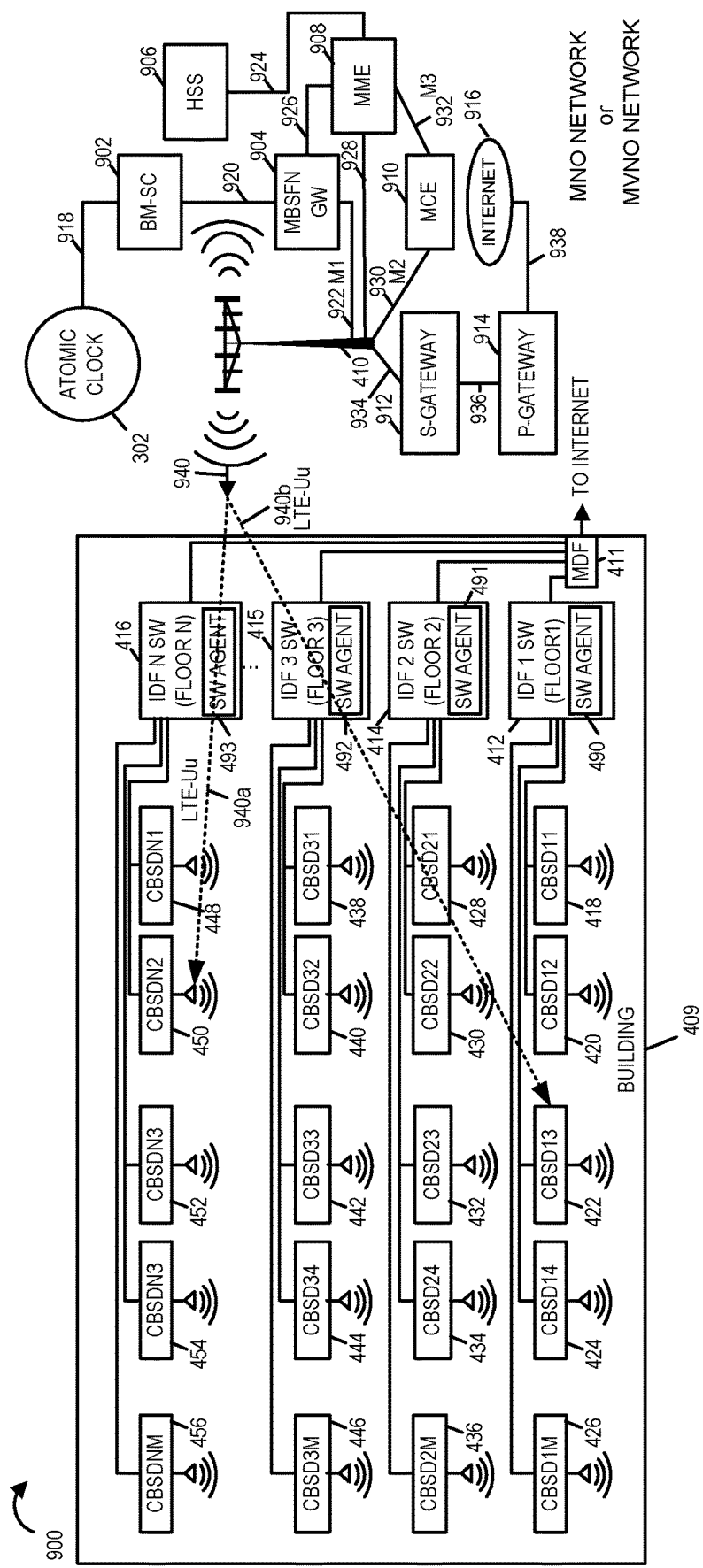
FIG. 9 illustrates exemplary evolved Multimedia Broadcast Multicast Service (eMBMS) architecture and communication of synchronization information to CBSDs, e.g. CBSDs included in a campus network, over the air, as part of a service in accordance with an exemplary embodiment.

FIG. 9 is a drawing 900 which illustrates exemplary evolved Multimedia Broadcast Multicast Service (eMBMS) architecture and communication of synchronization information to CBSDs, e.g. CBSDs included in a campus network, over the air as part of a service, in accordance with an exemplary embodiment. Drawing 900 of FIG. 9 includes exemplary building 409 including a plurality of CBDNs (CBSD11 418, . . . , CBSDNM 456), a plurality of IDF switches including SW agents (IDF 1 SW 412, . . . , IDF N SW 416), and MDF 411 coupled together as shown and previously described with respect to FIG. 4. Drawing 900 of FIG. 9 further includes a base station 410, e.g., an eNB CBRS base station, an atomic clock 302, a Broadcast Multicast-Service Center (BM-SC) 902, a Multicast-Broadcast Single Frequency Network Gateway (MBSFN GW) 904, a Home Subscriber Server (HSS) 906, a Mobility Management Entity (MME) 908, a Multicell-Multicast Coordination Entity (MCE) 910, a Serving Gateway (S-gateway) 912, a Packet Data Network Gateway (P-gateway) 914 and the Internet 916. In some embodiments, the one or more or all of the components (302, 902, 904, 906, 908, 910, 912, 914, and 410) are part of a Mobile Network Operator (MNO) network or a Mobile Virtual Network Operator (MVNO) network. In some embodiments BM-SC 902 includes a time server, e.g., a Network Time Protocol (NPT) server.

Atomic clock 302 is coupled to BM-SC 902 via communications link 918. BM-SC 902 is coupled to MBSFN GW 904 via communication link 920. HSS 906 is coupled to MME 908 via communications link 924. MBSFN GW 904 is coupled to base station 410 via communications link 922. MME is coupled to base station 410 via communications link 928. MME 908 is coupled to MCE 910 via communications link 932. MCE 910 is coupled to base station 410 via communications link 930. S-gateway 912 is coupled to base station 410 via communications link 934. P-gateway 914 is coupled to S-gateway 912 via communications link 936. P-gateway 914 is coupled to Internet 938 via communication link 938. HSS 906 includes information identifying which CBSDs subscribe to the synchronization information service. MME 908 provides mobility management of devices, e.g. CBSDs. BMSC-908 is a broadcast multicast service center providing one or more services to devices, e.g. CBSDs, said one or more services including a synchronization information service. Accurate timing information from atomic clock 302 is input to the BM-SC 902, which creates packets of sync info based on the received clock signals, said packets of sync info to be distributed to the subscribing CBSDs, via broadcast/multicast signals transmitted from base station 410, e.g., an eNB CBRS base station.

Base station 410, e.g., an eNB CBRS LTE base station supporting eMBMS, transmits (broadcasts) synch messages including sync packets, e.g. a sync packet in accordance with exemplary sync packet 800 of FIG. 8, via wireless broadcast signals 940 to CBSDs, which subscribe to the sync service, as a multicast. In the example of FIG. 9, CBSDN2 450 and CBSD13 422 are two of the CBSDs in the campus network corresponding to building 409, which subscribe the sync service offered by the service provider operator. CBSDN2 450 successfully receives broadcast signals 940 including sync messages, as indicated by dashed line arrow 940a. CBSD13 422 also successfully receives broadcast signals 940 including sync messages, as indicated by dashed line arrow 940b.

In FIG. 9, synch information is provided over the air from one network operator to a first set of CBSDs subscribing to the sync service offered by a first service provider. It should be appreciated that other network operators may, and sometimes do, offer a similar service to other sets of CBSDs subscribing to a sync service offered by another service provider. See FIG. 4, in which 3 different service providers provide sync information to different CBSDs in the campus network of building 409.

Figure 10:
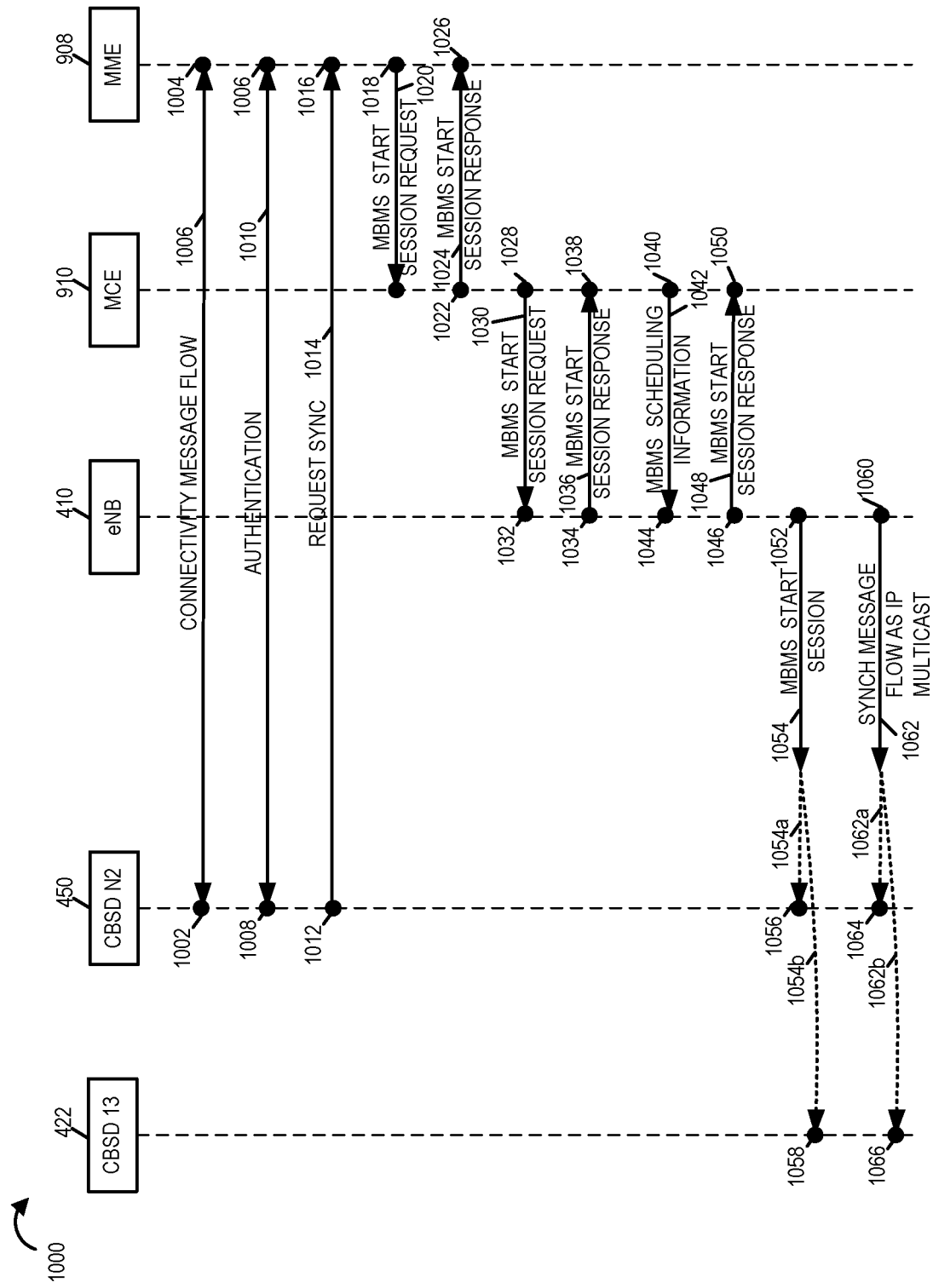
FIG. 10 is a drawing illustrating exemplary message flow for sync service over eMBMS in accordance with an exemplary embodiment.

FIG. 10 is a drawing 1000 illustrating exemplary message flow for sync service over eMBMS in accordance with an exemplary embodiment. Drawing 1000 includes two exemplary CBSDs (CBSD N2 450 and CBSD 13) which are part of a campus network corresponding to building 409 and which subscribe to a sync service over eMBMS. Drawing 1000 further includes additional nodes, previously shown and described with respect to FIG. 4, including base station 410, e.g., an LTE eNB CBRS base station supporting MBMS wireless transmissions, Multicell-Multicast Coordination Entity (MCE) 910 for controlling multicast operations of eNB 410 and Mobility Management Entity (MME) 908 for managing CBSDs (422, 450).

In steps 1002 and 1004, CBSD N2 450 and MME 908, are operated, respectively, to send and receive connectivity flow messages 1006. Thus CBSD N2 450 is connected to the network of an operator which provides a sync service over MBMS. In steps 1006 and 1008, CBSD N2 450 and MME 908, are operated, respectively, to send and receive authentication messages 1010. For example, the MME 908 may send a request for authentication information to the CBSD N2 450; and CBSD N2 450 may receive the authentication request and respond by sending authentication information to the MME 908. The MME 908 may receive and check the received the authentication information with stored authentication information corresponding to CBSN N2 450, and if the authentication is successful, the MME 908 notifies CBSD N2 450 that it has been successfully authenticated.

In step 450, CBSD N2 450 generates and sends a request for sync message 1014 to MME 908. In step 1016, MME 908 receives the request for sync message 1014, and in response in step 1018, MME 908 generates and sends MBMS start session request message 1020 to MCE 910. In step 1021, MBMS receives the MBMS start session request message 1020 and recovers the communicated information, e.g. indicating that MME 908 is requesting MCE 910 to control eNB 410 to start a MBMS session and transmit (broadcast) a sync message flow as IP multicast, e.g., for a multicast set including CBSD N2. In step 1022, MCE 910 generates and sends MBMS start session response message 1024 to MME 908, e.g. indicating that request was accepted. In step 1028, MCE 910 generates and sends a MBMS start session request message 1030 (e.g., a forwarded copy of message 1020) to eNB 410. In step 1032, eNB 410 receives the MBMS start session request message 1030 and recovers the communicated information. In step 1034, eNB 410 in response to message 1030, generates and sends MBMS start session response message 1036, e.g., indicating that the eNB 410 agrees to proceed with starting the requested MBMS session, to MCE 910. In step 1038 MCE 910 receives MBMS start response message 1036 and recovers the communicated information. In step 1040 MCE 910 generates and sends MBMS scheduling information message 1042 to eNB 410. In step 1044, eNB 410 receives message 1042 and recovers the scheduling information corresponding the requested session. In step 1046 eNB generates and sends a MBMS start session response message 1048 to the MCE 910, which is received by the MCE 910 in step 1050.

In step 1052, the eNB 410 generates and transmits (e.g., broadcasts over the air using multicast) a MBMS start session message 1054. In step 1056, CBSD N2 450 receives the MBMS start session message, as indicated by dotted line arrow 1054a, and recovers the communicated information indicating that a MBMS session is starting to communicate Sync information intended for a multicast including CBSN N2 450. In step 1058, CBSD 13 422 receives the MBMS start session message, as indicated by dotted line arrow 1054b, and recovers the communicated information indicating that a MBMS session is starting to communicate Sync information intended for a multicast including CBSN 13 422.

In step 1060 eNB 410 generates and transmits (e.g. broadcast over the air using multicast) a sync message flow as IP multicast 1062, said sync message flow including sync packets. In step 1064, CBSD N2 450 receives the sync message flow, as indicated by dotted line arrow 1062a, and recovers the communicated information, e.g., sync packets being provided as part of a sync service. In step 1066, CBSD 13 422 receives the sync message flow, as indicated by dotted line arrow 1062b, and recovers the communicated information, e.g., sync packets being provided as part of a sync service.

Figure 11:
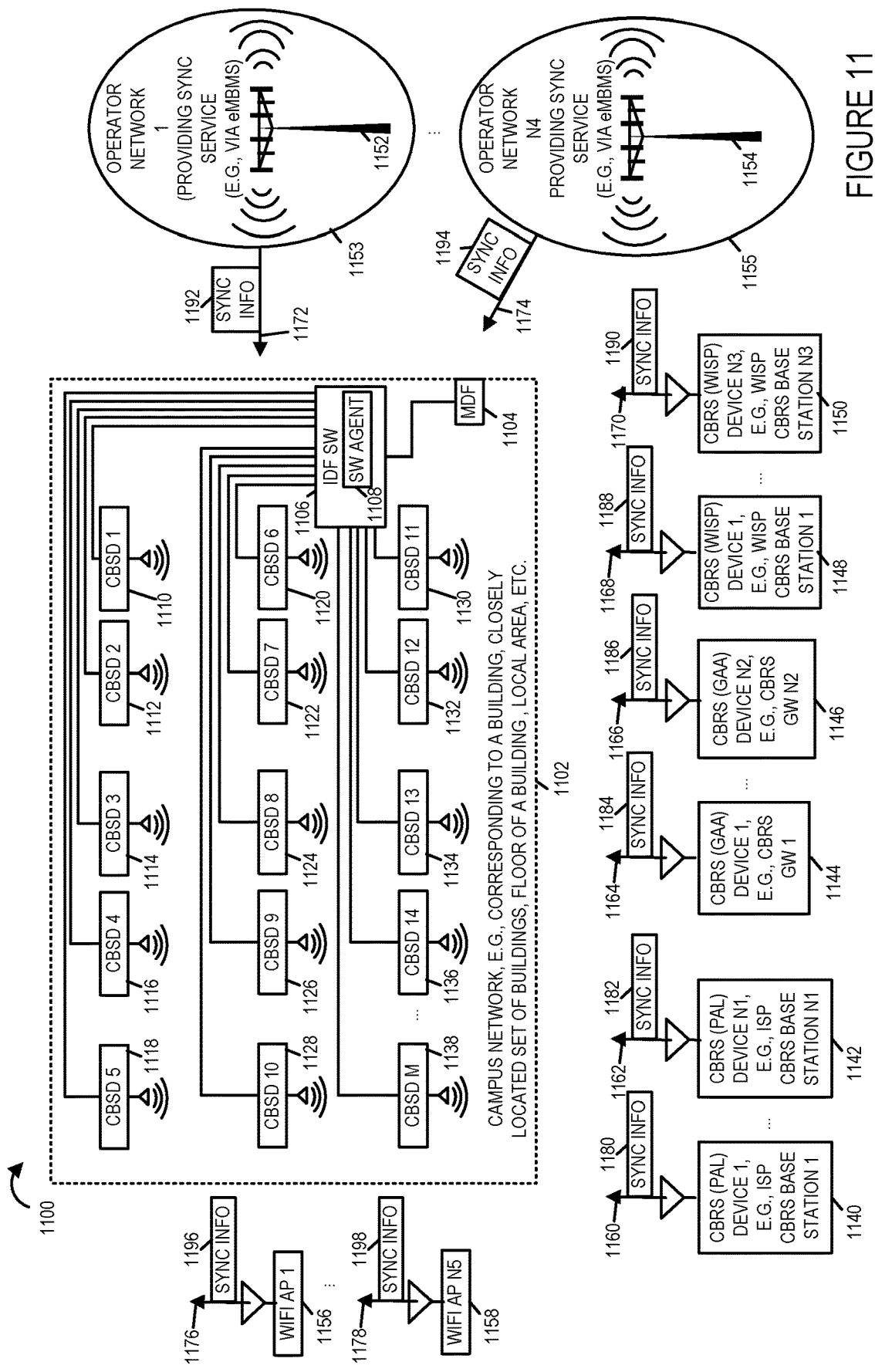
FIG. 11 is a drawing illustrating an exemplary campus network in which CBSD devices within the campus network monitor (listen) for wireless signals from a plurality of alternative sync sources in accordance with an exemplary embodiment.

FIG. 11 is a 1000 drawing illustrating an exemplary campus network 1102, e.g., corresponding to a building closely located set of buildings, floor of a building, local area, etc., in which CBSD devices within the campus network 1102 monitor (listen) for wireless signals from a plurality of alternative sync sources. Campus network 1102 includes a plurality of CBSD devices (CBSD 1 1110, CBSD 2 1112, CBSD 3 1114, CBSD 4 1116, CBSD 5 1118, CBSD 6 1120, CBSD 7 1122, CBSD8 1124, CBSD 9 1126, CBSD 10 1128, CBSD 11 1130, CBSD 12 1132, CBSD 13 1134, CBSD 14 1136, . . . , CBSD M 1138) coupled to an IDF SW 1106 and the IDF switch 1108 is coupled to an MDF 1104, which couples the campus network to the Internet. It is desirable for a single sync source to be used by the campus network. In this example, there are various potential alternatives sources of sync information, which are transmitting wireless signals, e.g. broadcast or multicast wireless signals conveying sync information, which may be detected and used. CBRS Priority Access License (PAL) device 1 1140, e.g., Internet Service Provider (ISP) CBRS base station 1 is transmitting, e.g. broadcasting, signals 1160 conveying sync information 1180. CBRS Priority Access License (PAL) device N1 1142, e.g., Internet Service Provider (ISP) CBRS base station N1 is transmitting, e.g. broadcasting, signals 1162 conveying sync information 1182. CBRS General Authorized Access (GAA) device 1 1144, e.g., CBRS GW 1, is transmitting, e.g. broadcasting, signals 1164 conveying sync information 1184. CBRS General Authorized Access (GAA) device N2 1146, e.g., CBRS GW N2, is transmitting, e.g. broadcasting, signals 1166 conveying sync information 1186. CBRS Wireless Internet Service Provider (WISP) device 1 1148, e.g., WISP CBRS base station 1, is transmitting, e.g. broadcasting, signals 1168 conveying sync information 1188. CBRS Wireless Internet Service Provider (WISP) device N3 1150, e.g., WISP CBRS base station N3, is transmitting, e.g. broadcasting, signals 1170 conveying sync information 1190. Base station 1152 of operator network 1 1153, which provides a sync service, e.g., via eMBMS, to subscribers, is transmitting, wireless multicast signals 1172 conveying sync info 1192. Base station 1154 of operator network N4 1155, which provides a sync service, e.g., via eMBMS, to subscribers, is transmitting, wireless multicast signals 1174 conveying sync info 1194. WiFi access point (AP) 1 1156 is transmitting wireless signals 1176 conveying sync information 1196. WiFi access point (AP) N5 1158 is transmitting wireless signals 1178 conveying sync information 1198.

Figure 12:
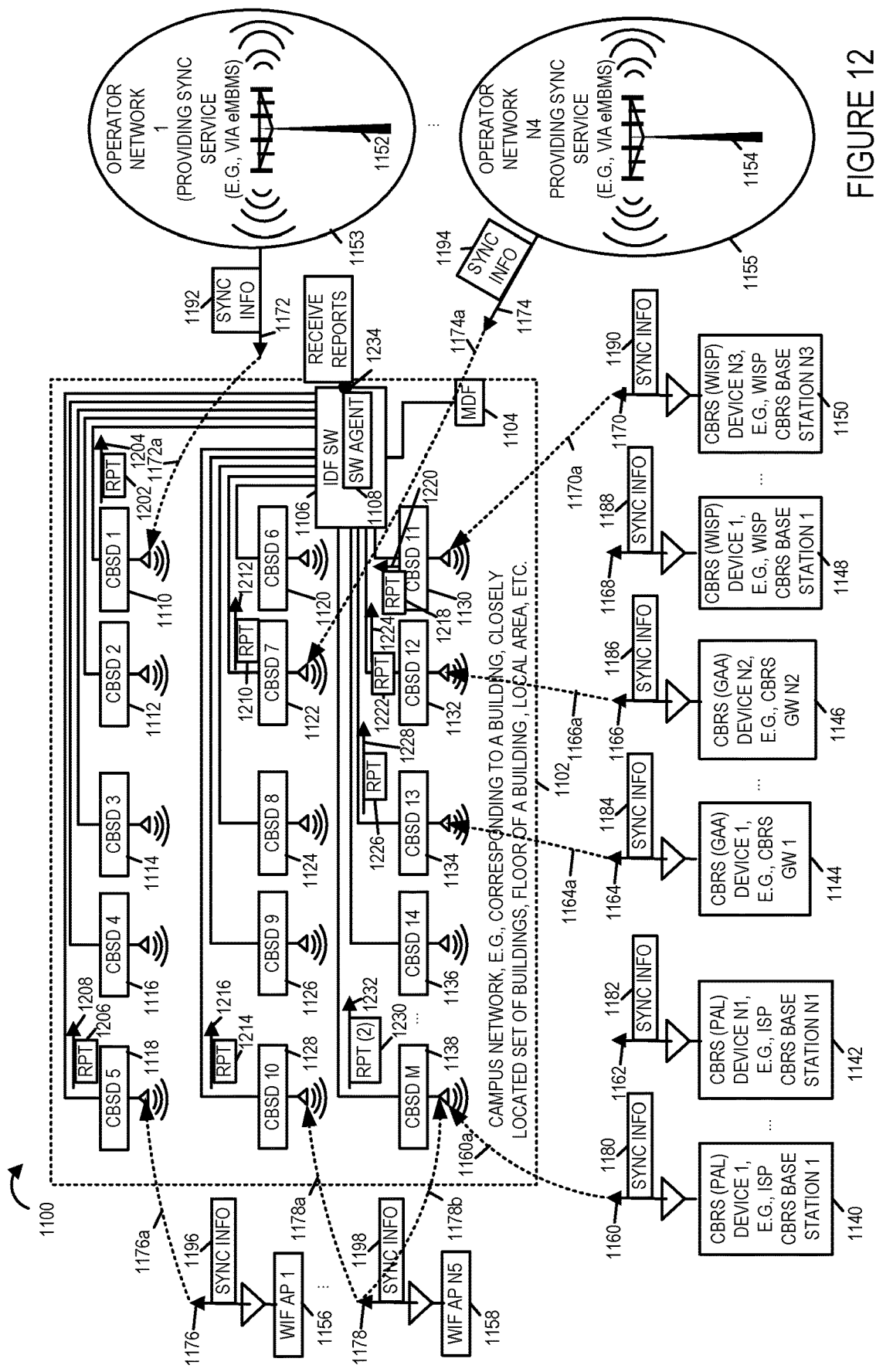
FIG. 12, which is a continual of the example of FIG. 11, illustrates CBSDs, detecting receiving and recovering sync information, generating accuracy reports with regard to received sync information, and sending the generated reports to a software agent on an IDf switch for processing and evaluation in accordance with an exemplary embodiment.

FIG. 12 is a continuation of the example of FIG. 11. FIG. 12 is a drawing 1200 illustrates wireless signals transmitted from various alternative synch sources being received and recovered by CBSDs in the campus network 1102, and the CBSD reporting to a software agent 1108 in the IDF switch 1106, in response to detected sync source(s). CBSD 1 1110 receives transmitted signals 1172, as indicated by dashed line arrow 1172a, recovers the communicated sync info 1192, processes the sync info, e.g., determining frequency sync accuracy, phase sync accuracy, and time sync accuracy, generates a report 1202 including a set of information corresponding to detected source 1152, generates a reporting message 1 204 including the report 1202, and sends the message 1 204 to the SW agent 1108 of the IDF switch 1106. CBSD 5 1118 receives transmitted signals 1176, as indicated by dashed line arrow 1176a, recovers the communicated sync info 1196, processes the sync info, e.g., determining frequency sync accuracy, phase sync accuracy, and time sync accuracy, generates a report 1206 including a set of information corresponding to detected source 1156, generates a reporting message 1208 including the report 1206, and sends the message 1208 to the SW agent 1108 of the IDF switch 1106. CBSD 7 1122 receives transmitted signals 1174, as indicated by dashed line arrow 1174a, recovers the communicated sync info 1194, processes the sync info, e.g., determining frequency sync accuracy, phase sync accuracy, and time sync accuracy, generates a report 1210 including a set of information corresponding to detected source 1154, generates a reporting message 1212 including the report 1210, and sends the message 1212 to the SW agent 1108 of the IDF switch 1106. CBSD 10 1128 receives transmitted signals 1178, as indicated by dashed line arrow 1178a, recovers the communicated sync info 1198, processes the sync info, e.g., determining frequency sync accuracy, phase sync accuracy, and time sync accuracy, generates a report 1214 including a set of information corresponding to detected source 1158, generates a reporting message 1216 including the report 1214, and sends the message 1216 to the SW agent 1108 of the IDF switch 1106. CBSD 11 1130 receives transmitted signals 1170, as indicated by dashed line arrow 1170a, recovers the communicated sync info 1190, processes the sync info, e.g., determining frequency sync accuracy, phase sync accuracy, and time sync accuracy, generates a report 1218 including a set of information corresponding to detected source 1150, generates a reporting message 1220 including the report 1218, and sends the message 1220 to the SW agent 1108 of the IDF switch 1106. CBSD 12 1132 receives transmitted signals 1166, as indicated by dashed line arrow 1166a, recovers the communicated sync info 1186, processes the sync info, e.g., determining frequency sync accuracy, phase sync accuracy, and time sync accuracy, generates a report 1222 including a set of information corresponding to detected source 1146, generates a reporting message 1224 including the report 1222, and sends the message 1224 to the SW agent 1108 of the IDF switch 1106. CBSD 13 1134 receives transmitted signals 1164, as indicated by dashed line arrow 1164a, recovers the communicated sync info 1184, processes the sync info, e.g., determining frequency sync accuracy, phase sync accuracy, and time sync accuracy, generates a report 1226 including a set of information corresponding to detected source 1144, generates a reporting message 1228 including the report 1226, and sends the message 1228 to the SW agent 1108 of the IDF switch 1106. CBSD M 1138 receives transmitted signals 1178, as indicated by dashed line arrow 1178b, recovers the communicated sync info 1198, processes the sync info, e.g., determining frequency sync accuracy, phase sync accuracy, and time sync accuracy, generates a first report portion including a set of information corresponding to detected source 1158, receives transmitted signals 1160, as indicated by dashed line arrow 1160b, recovers the communicated sync info 1180, processes the sync info, e.g., determining frequency sync accuracy, phase sync accuracy, and time sync accuracy, generates a second report portion including a set of information corresponding to detected source 1140, generates a report 1230 including both the first and second report portions, generates a reporting message 1232 including the report 1230, and sends the message 1232 to the SW agent 1108 of the IDF switch 1106. In step 1234, the SW agent 1108 of IDF switch 1106 receives the reporting messages (1 204, 1208, 1212, 1216, 1220, 1224, 1228, 1232) and recovers the reports (1202, 1206, 1210, 1214, 1218, 1222, 1226, 1230), e.g., generating a table similar to table 700 of FIG. 7.

Figure 13:
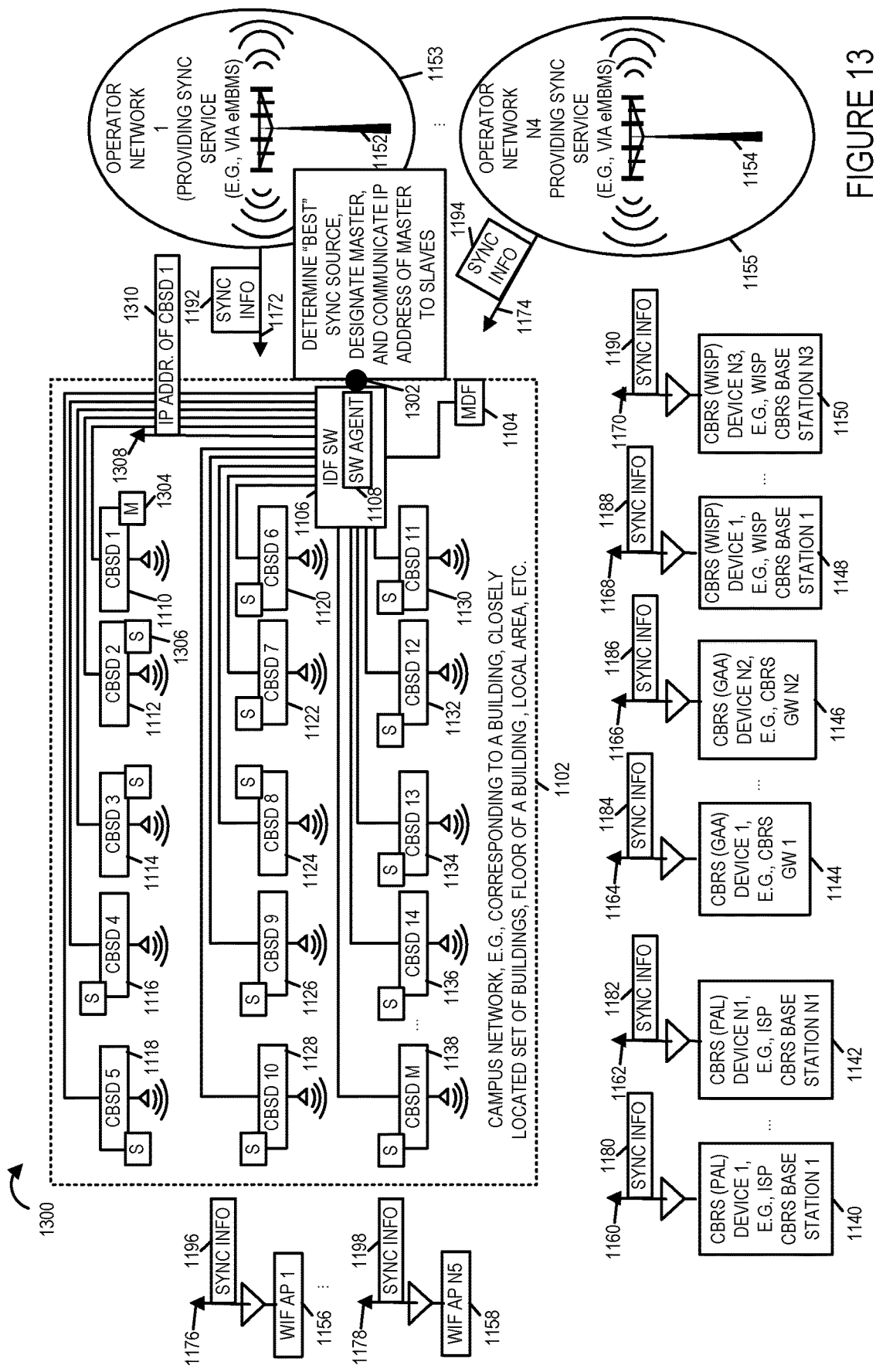
FIG. 13, which is a continuation of the example of FIG. 12, illustrates the software agent of the IDF switch selecting a "best" sync source, designating one of the CBSDs as the master device for the campus network with regard to sync information, and communicating the IP address of the selected device to the other CBSDs (slaves) in the campus network, in accordance with an exemplary embodiment.

FIG. 13 is a continuation of the example of FIG. 12. Drawing 1300 of FIG. 13 illustrates the SW agent 1108 of IDF switch 1106 selecting a best sync source from among the alternative candidate sync source which have been reported, e.g., based on a selection algorithm using predetermined criteria, designating a master CBSD (with regard to providing sync info) within the campus network 1102, and communicating the IP address of the selected master to the CBSDs in the campus network 1102. In this example, in step 1302 SW agent 1108 of IDF switch 1106 determines (based on report entry comparisons and a selection algorithm) that the "best" sync source (e.g., most accurate and/or most stable) is being provided by CBSD 1 1110; therefore, SW agent 1108 designates CBSD 1 1110 as the master device for providing sync information, as indicated by boxed M 1304, to other devices in the campus network 1102, which are slave devices, as indicated by boxed S 1306. SE agent 1108 generates and sends message 1308 including information communicating that CBSD 1 1310 is the currently designated master for providing sync information and the IP address 1310 of CBSD 1. In some embodiments, if the selected master device has reported multiple alternative sources for sync, then the SW agent 1108 communicated to the master device which one of the reported alternatives sources for sync is to be used.

Figure 14:
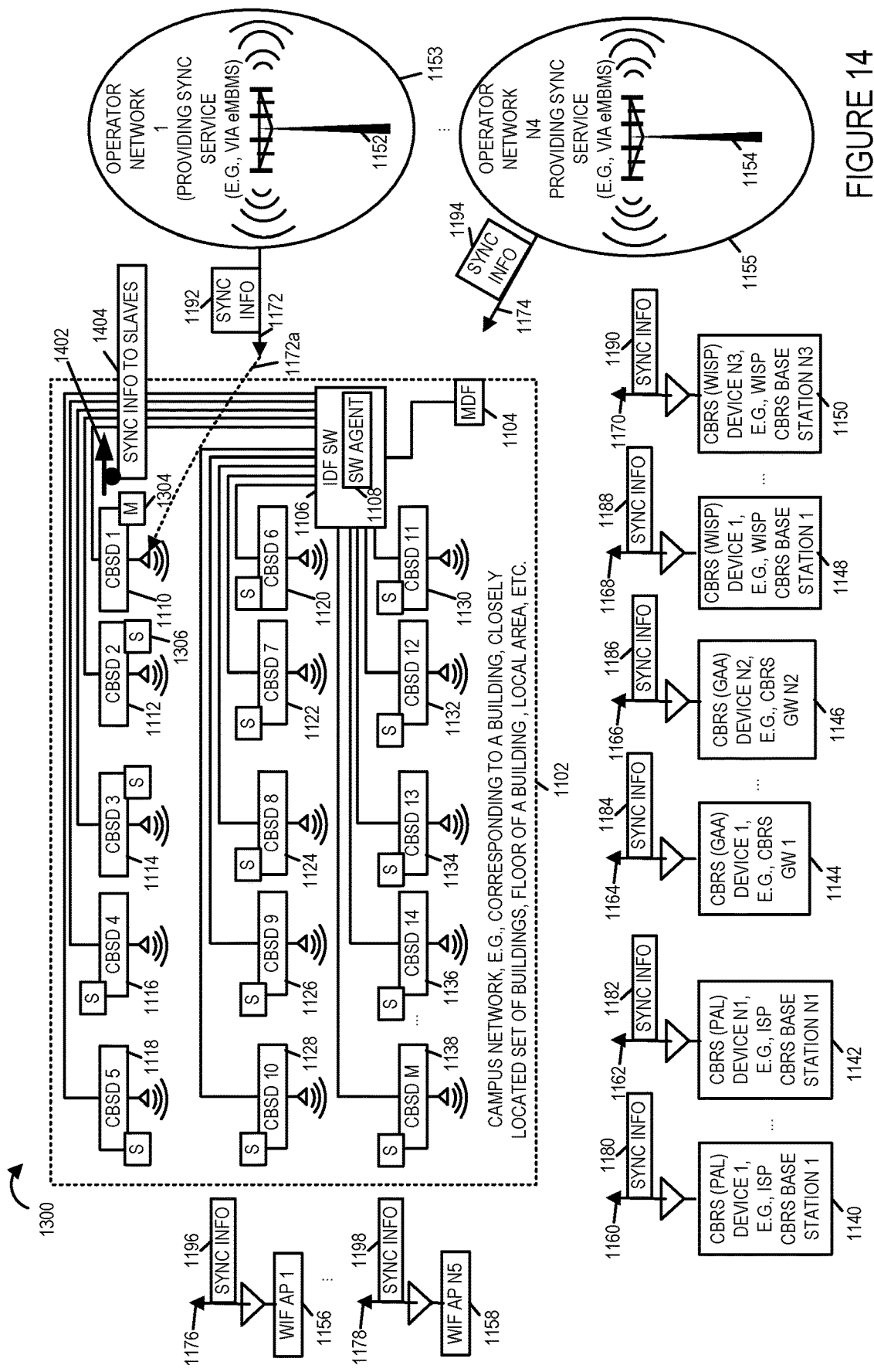
FIG. 14, which is a continuation of the example of FIG. 13, illustrates the currently designated master CBSD, with regard to sync information, receiving sync information, via wireless signals from a base station of a network operator providing a sync service via eMBMS, and propagating the sync information to slave devices in the campus network, in accordance with an exemplary embodiment.

FIG. 14 is a continuation of the example of FIG. 13. Drawing 1400 of FIG. 14 illustrates CBSD 1 1110, which is the currently designated master device for providing sync to the campus network 1102, receives messages 1172 communicating sync information 1192. CBSD 1 1110 generates sync messages (based on the recovered information 1192 in received messages 1172) and sends sync messages 1402 to the slave devices (1112, 1114, 1116, 1118, 1118, 1120, 1124, 1126, 1128, 1130, 1132, 1134, 1136, . . . , 1138) in campus network 1102, communicating sync info 1404, to the slaves, which receive and recover the sync messages 1402 and information 1404.

Figure 15A:
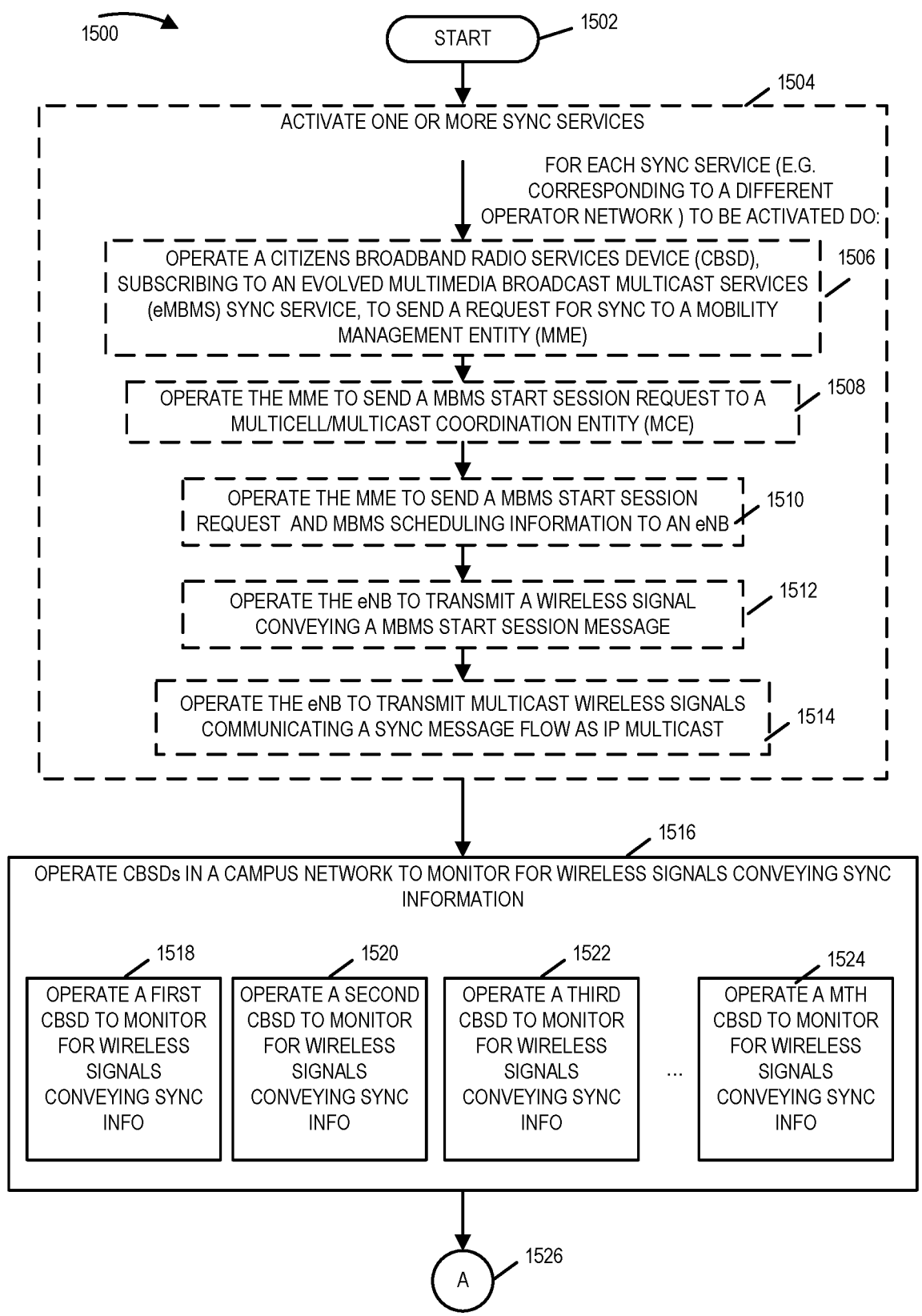
FIG. 15A is a first part of flowchart of an exemplary method for providing access to timing information in accordance with an exemplary embodiment.
Figure 15B:
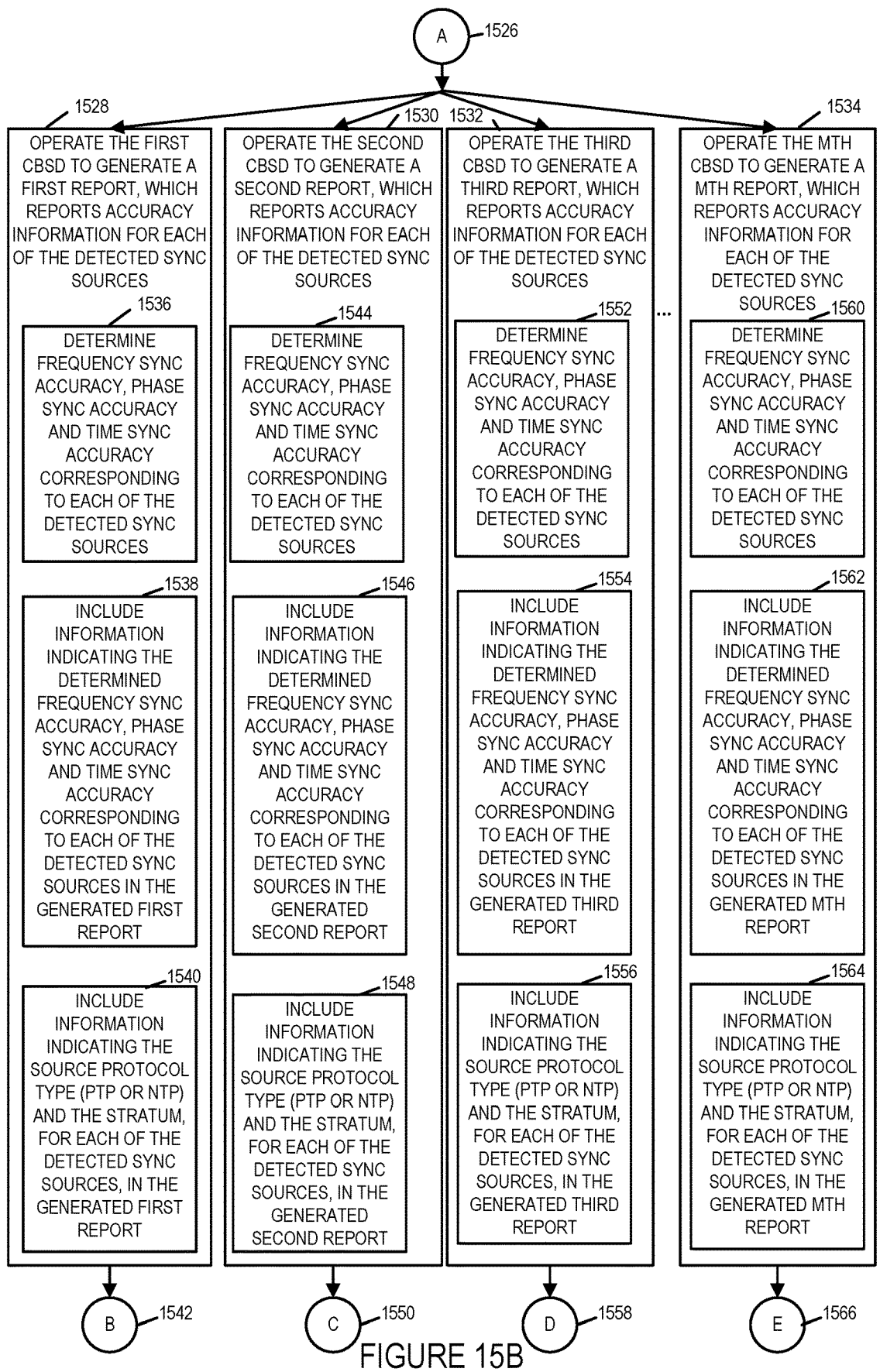
FIG. 15B is a second part of flowchart of an exemplary method for providing access to timing information in accordance with an exemplary embodiment.
Figure 15C:
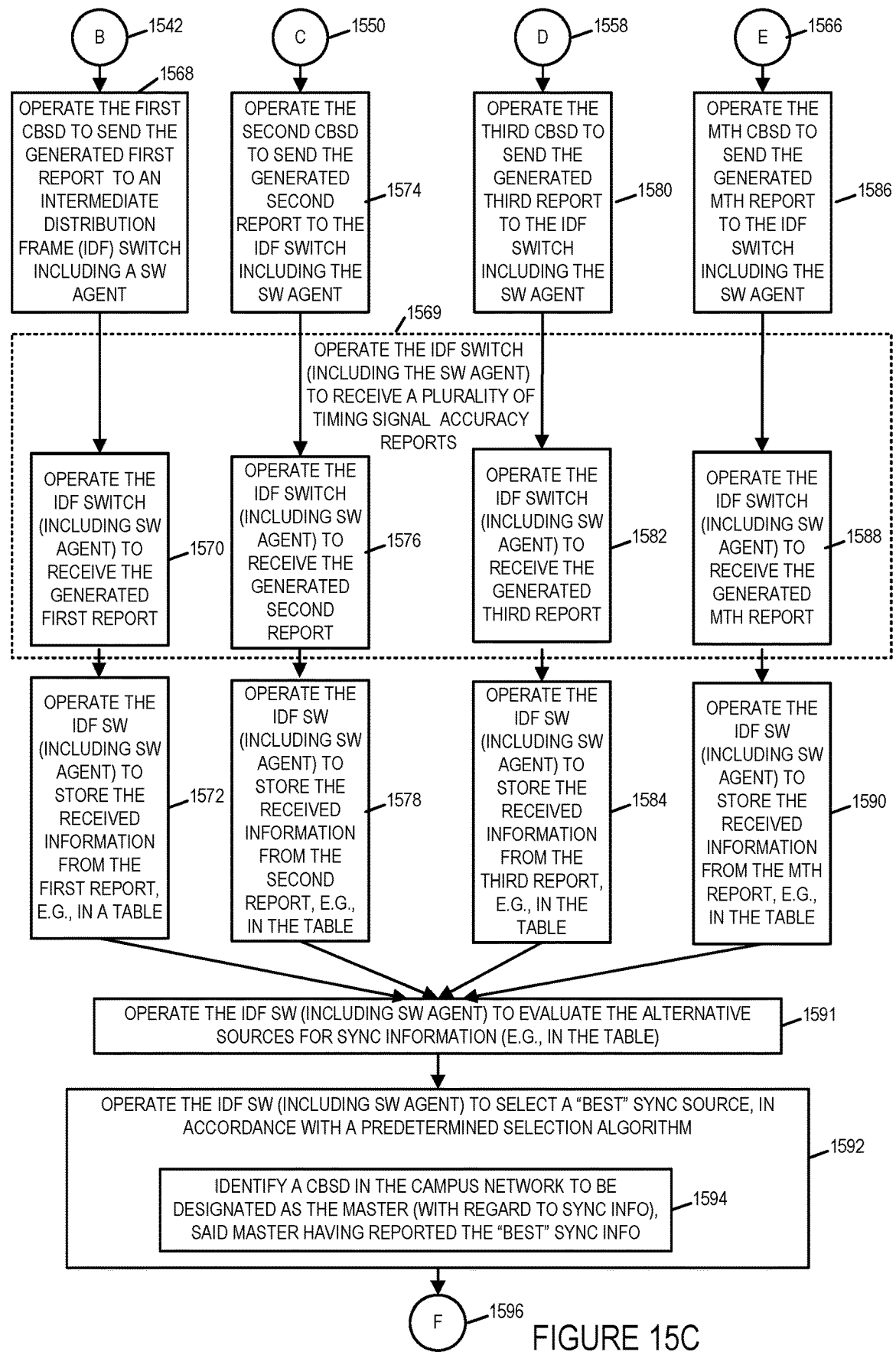
FIG. 15C is a third part of flowchart of an exemplary method for providing access to timing information in accordance with an exemplary embodiment.
Figures 15, 15D:
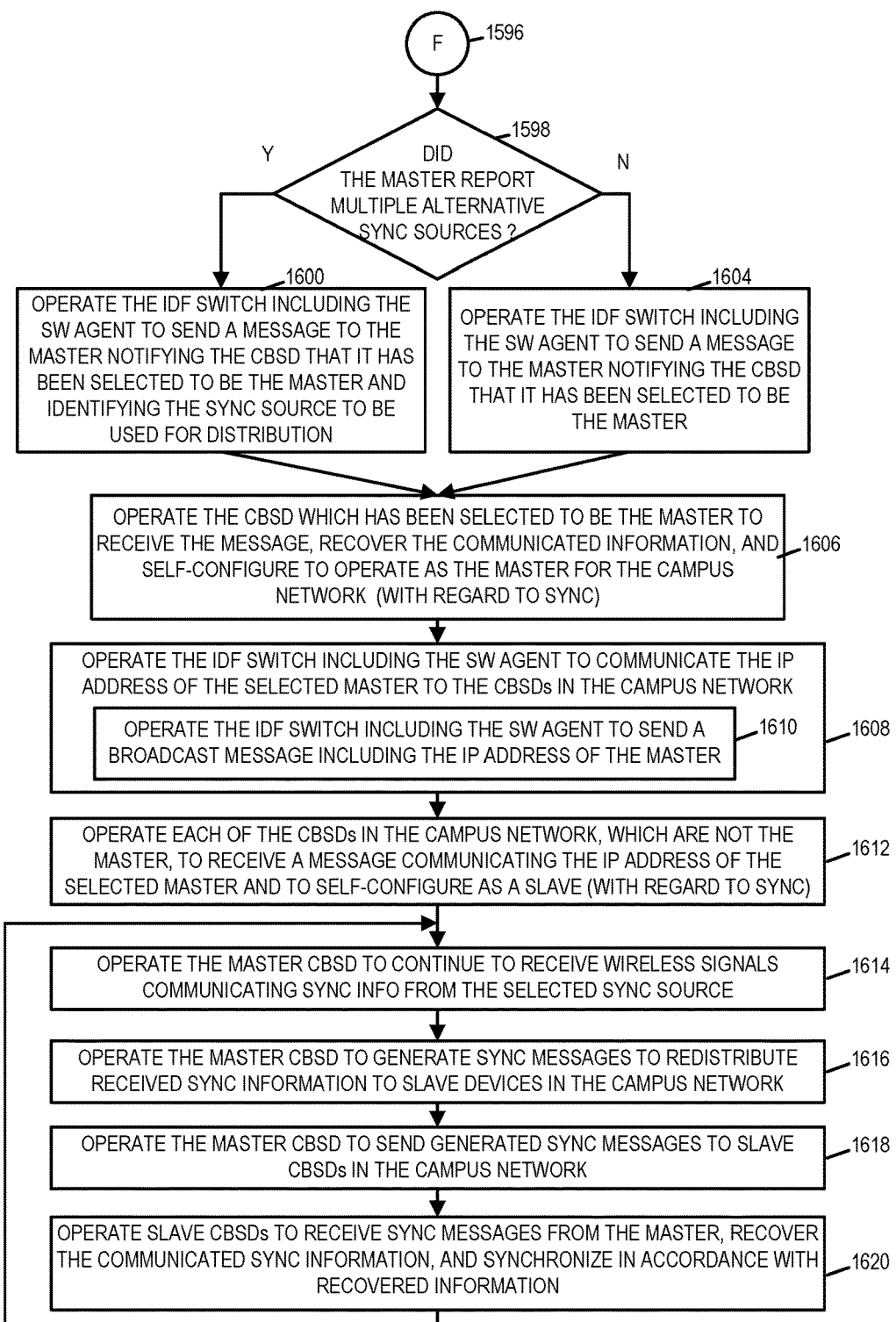
FIG. 15D is a fourth part of flowchart of an exemplary method for providing access to timing information in accordance with an exemplary embodiment.
FIG. 15 comprises the combination of FIG. 15A, FIG. 15B, FIG. 15C and FIG. 15D.

FIG. 15, comprising the combination of FIG. 15A, FIG. 15B, FIG. 15C and FIG. 15D, is a flowchart 1500 of an exemplary method for providing access to timing information in accordance with an exemplary embodiment. Operating starts in step 1502 in which a communications system, e.g., a communications system including a campus network including: i) a plurality of wireless devices, e.g., indoor CBSDs, stations (STAs), user equipment (UE) devices, etc., and ii) a switch, e.g., an intermediate distribution frame (IDF) switch included a software agent, and a plurality of devices transmitting wireless signals, e.g., CBRS PAL operator devices, CBRS GAA operator devices, CBRS WISP operator devices, operator network base station providing a sync service, e.g. via eMBMS, and/or WiFi access points, which may, and sometimes do, convey synchronization (sync) information, are powered on and initialized.

In some embodiments, e.g., some embodiments in which one or more sync services can be, and sometimes are, provided to one or more of the wireless devices, e.g., indoor CBSDs, of the campus network, operation proceeds from step 1502 to step 1504. In other embodiments, operation proceeds from step 1502 to step 1516.

Returning to step 1504, in step 1504, one or more sync services are activated. Step 1504 includes steps 1506, 1508, 1510, 1512 and 1514. One iteration of steps 1506, 1508, 1510, 1512 and 1514 is performed for each sync service to be activated. Different sync services may correspond to different operator networks and different indoor CBSDs in the campus network may subscribe to different sync services. The exemplary sync service described in FIG. 15 is an evolved Multimedia Broadcast Multicast Services (eMBMS) sync service; however, it should be appreciated that other alternative sync services, e.g. in which indoor devices subscribe to the sync service offered by a network operator for communicating sync information via wireless signals, are possible and used in some embodiments.

In step 1504, a Citizens Broadband Radio Services Device (CBSD) subscribing to a eMBMS sync service sends a request for sync to a mobility management entity (MME). Operation proceeds from step 1506 to step 1508. In step 1508 the MME sends a MBMS start session request to a multicell/multicast coordination entity (MCE). In step 1510 the MME send a MBMS start session request and MBMS scheduling information to an eNB. In step 1512 the eNB transmits a wireless signal conveying a MBMS start session message. In step 1514 the eNB generates and transmits multicast wireless signals communicating a sync message flow as IP multicast. Operation proceeds from step 1504 to step 1516.

In step 1516 CBSDs in the campus network are operate to monitor for wireless signals conveying sync information. Step 1516 includes steps 1518, 1520, 1522 and 1522. In step 1518 a first CBSD is operated to monitor for wireless signals conveying sync information. In step 1520 a second CBSD is operated to monitor for wireless signals conveying sync information. In step 1522 a third CBSD is operated to monitor for wireless signals conveying sync information. In step 1524 a Mth. CBSD is operated to monitor for wireless signals conveying sync information.

Figure 16:
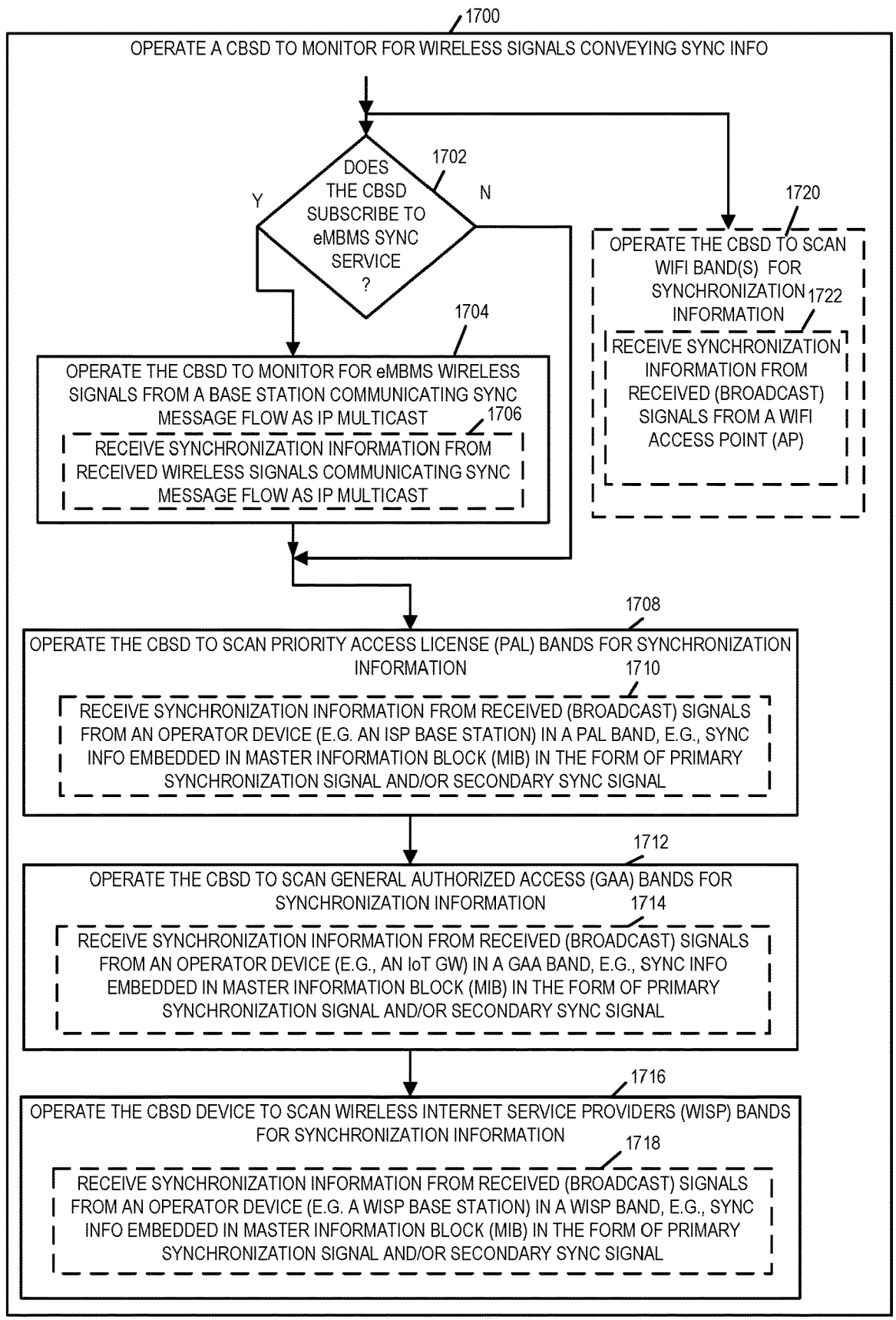
FIG. 16 is a drawing illustrating a detailed representation of an exemplary step of operating a communications device including a wireless receiver, e.g., a CBSD, to monitor for wireless signals conveying sync information, in accordance with an exemplary embodiment.

FIG. 16 is a drawing 1700 illustrating a more detailed representation of an exemplary step of operating a CBSD to monitor for wireless signals conveying sync information. Thus step 1700 may be used to replace each of steps 1518, 1520, 1522, . . . , 1524 within step 1516 of flowchart 1500. In step 1702, the CBSD determines if the CBSD subscribes to an eMBMS sync service. If the CBSD, subscribes to an eMBMS sync service, then operation proceeds from step 1702 to step 1704. However, if the CBSD, does not subscribe to an eMBMS sync service, then operation proceeds from step 1702 to step 1708. In step 1704 the CBSD monitors for eMBMS wireless signals from a base station communicating a sync message flow as IP multicast. Step 1704 may, and sometimes does, includes step 1706, in which the CBSD receives synchronization information from received wireless signals communicating sync message flow as IP multicast. Operation proceeds from step 1704 to step 1708.

In step 1708 the CBSD scans Priority Access License (PAL) bands for synchronization information. Step 1708 may, and sometimes does, include step 1710, in which the CBSD receives synchronization information from received (broadcast) signals from an operator device, e.g., from an Internet Service Provider (ISP) base station transmitting signals conveying sync information in a PAL band. For example, the CBSD receives sync information embedded in master information block (MIB) in the form of primary synchronization (SYNC) signal and/or secondary SYNC signal, which were communicated in a PAL band. Operation proceeds from step 1708 to step 1712.

In step 1712 the CBSD scans General Authorized Access (GAA) bands for synchronization information. Step 1712 may, and sometimes does, include step 1714, in which the CBSD receives synchronization information from received (broadcast) signals from an operator device, e.g., from an Internet of Things (IoT) Gateway (GW) transmitting signals conveying sync information in a GAA band. For example, the CBSD receives sync information embedded in master information block (MIB) in the form of primary synchronization (SYNC) signal and/or secondary SYNC signal, which were communicated in a GAA band. Operation proceeds from step 1714 to step 1716.

In step 1716 the CBSD scans Wireless Internet Service Provider (WISP) bands for synchronization information. Step 1716 may, and sometimes does, include step 1718, in which the CBSD receives synchronization information from received (broadcast) signals from an operator device, e.g., from a WISP base station transmitting signals conveying sync information in a WISP band. For example, the CBSD receives sync information embedded in master information block (MIB) in the form of primary synchronization (SYNC) signal and/or secondary SYNC signal, which were communicated in a WISP band.

In some embodiments, the CBSD includes a WiFi receiver and in step 1720, the CBSD scans one or more WiFi bands for synchronization information. Step 1720 may, and sometimes does, include step 1722, in which the CBSD receives synchronization information from received (broadcast) signals from a WiFi access point (AP).

Returning to FIG. 15, operation proceeds from step 1516, via connecting node A 1526 to steps 1528, 1530, 1532, 1534, which may be performed in parallel. In step 1528 the first CBSD generates a first report, which reports accuracy information for each of the detected sync sources, which were detected by the first CBSD. Step 1528 includes step 1536, 1538 and 1540. In step 1536 the first CBSD determines frequency sync accuracy, phase sync accuracy and time sync accuracy corresponding to each of the detected sync sources. In step 1538 the first CBSD includes information indicating the determined frequency sync accuracy, phase sync accuracy and time sync accuracy corresponding to each of the detected sync sources in the generated first report. In step 1540 the first CBSD includes information indicating the source protocol type, e.g. PTP or NTP, and the stratum for each of the detected sync sources in the generated first report.

In step 1530 the second CBSD generates a second report, which reports accuracy information for each of the detected sync sources, which were detected by the second CBSD. Step 1530 includes step 1544, 1546 and 1548. In step 1544 the second CBSD determines frequency sync accuracy, phase sync accuracy and time sync accuracy corresponding to each of the detected sync sources. In step 1546 the second CBSD includes information indicating the determined frequency sync accuracy, phase sync accuracy and time sync accuracy corresponding to each of the detected sync sources in the generated second report. In step 1548 the second CBSD includes information indicating the source protocol type, e.g. PTP or NTP, and the stratum for each of the detected sync sources in the generated second report.

In step 1532 the third CBSD generates a third report, which reports accuracy information for each of the detected sync sources, which were detected by the third CBSD. Step 1532 includes step 1552, 1554 and 1556. In step 1554 the third CBSD determines frequency sync accuracy, phase sync accuracy and time sync accuracy corresponding to each of the detected sync sources. In step 1556 the third CBSD includes information indicating the determined frequency sync accuracy, phase sync accuracy and time sync accuracy corresponding to each of the detected sync sources in the generated third report. In step 1558 the third CBSD includes information indicating the source protocol type, e.g. PTP or NTP, and the stratum for each of the detected sync sources in the generated third report.

In step 1534 the Mth CBSD generates a Mth report, which reports accuracy information for each of the detected sync sources, which were detected by the Mth CBSD. Step 1534 includes step 1560, 1562 and 1564. In step 1560 the Mth CBSD determines frequency sync accuracy, phase sync accuracy and time sync accuracy corresponding to each of the detected sync sources. In step 1562 the Mth CBSD includes information indicating the determined frequency sync accuracy, phase sync accuracy and time sync accuracy corresponding to each of the detected sync sources in the generated Mth report. In step 1564 the Mth CBSD includes information indicating the source protocol type, e.g. PTP or NTP, and the stratum for each of the detected sync sources in the generated Mth report.

Operation proceeds from step 1528, via connecting node B 1542 to step 1568. Operation proceeds from step 1530, via connecting node C 1560 to step 1574. Operation proceeds from step 1532, via connecting node D 1558 to step 1580. Operation proceeds from step 1534, via connecting node E 1566 to step 1586.

In step 1568 the first CBSD sends the generated first report to an intermediate distribution frame (IDF) switch including a software (SW) agent. Operation proceeds from step 1568 to step 1570. In step 1570, the IDF switch including the software agent receives the generated first report. Operation proceeds from step 1570 to step 1572, in which the IDF switch including the SW agent stores the received information from the first report, e.g., in a table.

In step 1574 the second CBSD sends the generated second report to the intermediate distribution frame (IDF) switch including the software (SW) agent. Operation proceeds from step 1574 to step 1576. In step 1576, the IDF switch including the software agent receives the generated second report. Operation proceeds from step 1576 to step 1578, in which the IDF switch including the SW agent stores the received information from the second report, e.g., in the table.

In step 1580 the third CBSD sends the generated third report to the intermediate distribution frame (IDF) switch including the software (SW) agent. Operation proceeds from step 1580 to step 1582. In step 1582, the IDF switch including the software agent receives the generated third report. Operation proceeds from step 1582 to step 1584, in which the IDF switch including the SW agent stores the received information from the third report, e.g., in the table.

In step 1586 the Mth CBSD sends the generated Mth report to the intermediate distribution frame (IDF) switch including the software (SW) agent. Operation proceeds from step 1586 to step 1588. In step 1588, the IDF switch including the software agent receives the generated Mth report. Operation proceeds from step 1588 to step 1590, in which the IDF switch including the SW agent stores the received information from the Mth report, e.g., in the table.

Steps 1570, 1576, 1582 and 1588 are part of step 1569, in which the IDF switch including the SW agent receives a plurality of timing signal accuracy reports.

Operation proceeds from steps 1572, 1578, 1584 and 1590 to step 1591. In step 1591 the IDF switch including the SW agent evaluates the alternative sources for sync information (e.g., in a table, e.g., a phase, frequency and timing accuracy summary table similar to exemplary table 700 of FIG. 7). Operation proceeds from step 1591 to step 1592.

In step 1592 the IDF switch including the SW agent selects a "best" sync source, in accordance with a predetermined selection algorithm. Step 1592 includes step 1594 in which the IDF switch including the SW agent identifies a CBSD in the campus network to be designated as the master (with regard to sync information), said master having reported the "best" sync information. Operation proceeds from step 1592, via connecting node F 1596, to step 1598.

In step 1598 the IDF switch including the SW agent checks as to whether the selected master CBSD reported multiple alternative sync sources. If the selected master reported multiple alternative sync sources, then operation proceeds from step 1598 to step 1600; otherwise, operation proceeds from step 1598 to step 1604.

In step 1600 the IDF switch including the SW agent sends a message to the selected master notifying that CBSD, that it has been selected to be the master (with regard to sync information) and identifying the sync source to be used for distribution to other CBSDs (slaves) in the campus network.

In step 1604, the IDF switch including the software agent sends a message to the master notifying that CBSD that it has been selected to be the master (with regard to sync information for the campus network). Operation proceeds from step 1600 or step 1604 to step 1606.

Operation proceeds from step 1600 or step 1604 to step 1606. In step 1606 the CBSD which has been selected to be the master receives the notification message (from step 1600 or step 1604), recovers the communicated information and self-configures to operate as the master for the campus network (with regard to sync). Operation proceeds from step 1606 to step 1608.

In step 1608 the IDF switch including the SW agent communicates the IP address of the selected master to the CBSDs in the campus network. In some embodiments, step 1608 includes step 1610, in which the IDF switch including the SW agent send a broadcast message including the IP address of the master. Operation proceeds from step 1608 to step 1612.

In step 1612 each of the CBSDs in the campus network, which are not the master, receive the message communicating the IP address of the selected master and self-configure as a slave (with regard to sync information). Operation proceeds from step 1612 to step 1614.

In step 1614 the master CBSD continues to receive wireless signals communicating sync information from the selected sync source. Operation proceeds from step 1614 to step 1616. In step 1616 the master CBSD generates sync messages to redistribute received sync information to slave devices in the campus network. Operation proceeds from step 1616 to step 1618. In step 1618 the master CBSD sends generated sync messages to slave CBSDs in the campus network, e.g., as broadcast messages and/or in response to requests from individual slave CBSDs. Operation proceeds from step 1618 to step 1620. In step 1620 slave CBSDs received sync messages from the master, recover the communicated sync information and synchronize in accordance with the recovered information. Operation proceeds from step 1620 to step 1614.

Figure 17:
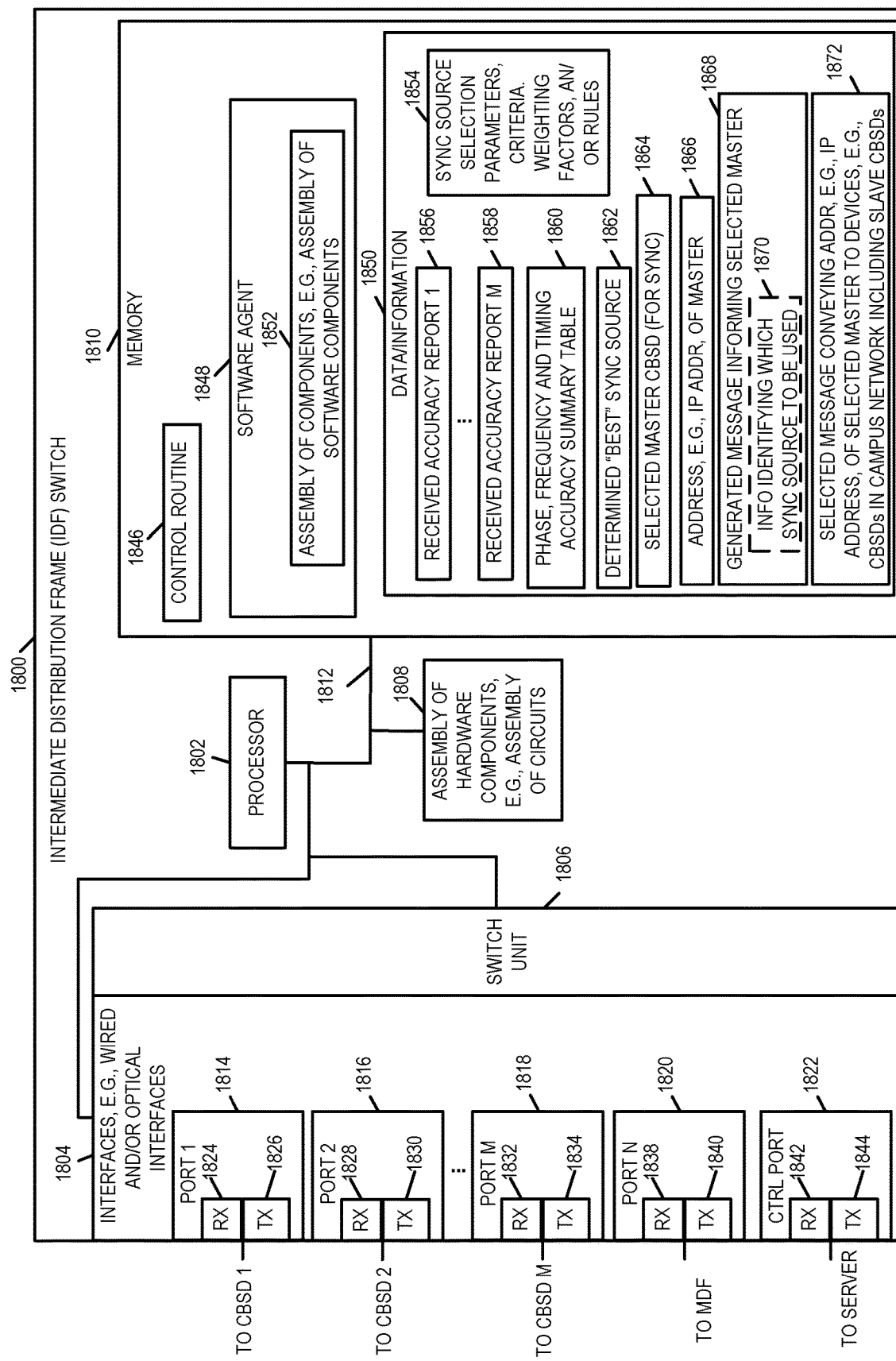
FIG. 17 is a drawing of an exemplary intermediate distribution frame (IDF) switch implemented in accordance with an exemplary embodiment.

FIG. 17 is a drawing of an exemplary intermediate distribution frame (IDF) switch 1800 including a software (SW) agent implemented in accordance with an exemplary embodiment. Exemplary IDF switch 1700 is, e.g. any of IDF switch 416 of FIG. 4 or FIG. 9, IDF switch 415 of FIG. 4 or FIG. 9, IDF switch 414 of FIG. 4 or FIG. 9, IDF switch 412 of FIG. 4 or FIG. 9, IDF switch 502 of FIG. 5, IDF switch 1106 of FIGS. 11-14, or the IDF switch described with respect to the flowcharts of FIG. 15 (including FIG. 15A, FIG. 15B, FIG. 15C and FIG. 15D) and FIG. 16.

Exemplary IDF switch 1800 includes a processor 1802, e.g., a CPU, interfaces, e.g., wired and/or optical interfaces, a switch unit 1806, an assembly of hardware components 1808, e.g., an assembly of circuits, and memory 1810, coupled together via bus 1812 over which the various elements may interchange data and information.

Interfaces 1804 includes a plurality of ports, which may be, and sometimes are, coupled to CBSDs, e.g., indoor CBSDs, in the local vicinity (e.g., same building or same floor) of the IDF switch, (port 1 1814, port 2 1816, . . . , port M 1832). In one exemplary embodiment, port 1 1814 is coupled to CBSD 1, port 2 is coupled to CBSD 2 1816, and port M is coupled to CBSD M, where CBSD 1, CBSD 2, CBSD M and the IDF switch 1800 are part of a campus network. Interfaces 1804 further includes port N 1820 coupled to an MDF and, in some embodiments, a control port 1822 coupled to a server, e.g., a control server included as part of the IDF in which the IDF switch is located. Each of the ports (port 1 1814, port 2 1816, . . . , port M 1818, port N 1820, control port 1822) includes a receiver and transmitter pair ((RX 1824, TX 1826), (RX 1828, TX 1830), . . . , (RX 1832, TX 1834), (RX 1838, TX 1840), (RX 1842, TX 1844)), respectively. The ports (1814, 1816, . . . , 1818, 1820, 1822) are coupled to switch unit 1806, e.g., which under the control of processor 1802 couples various inputs and outputs together.

Memory 1810 includes control routine 1846, e.g., controlling the IFS switch 1800 to perform basic functions, e.g., load instructions from memory into the CPU, control switching unit to couples various ports to one another, etc., software agent 1848, and data/information 1850. Software agent 1848 includes an assembly of components 1852, e.g., an assembly of software components, e.g. routines and/or software modules, which when executed control the IDF switch to implement various steps of an exemplary method in accordance with an exemplary embodiment. Exemplary steps include, e.g. receiving timing signal accuracy reports from one of more CBSDs which detected sync information from one or more received wireless signals, selecting a "best" sync source, identifying a master CBSD with regard to providing sync information to other CBSDs in the campus network, notifying a CBSD that it has been selected to be the master and, in some embodiments, to use a particular source of sync information, communicating the address, e.g., IP address, of the selected master CBSD to the CBSDs in the campus network. Data/information 1850 includes a plurality of received accuracy reports (received accuracy report 1 1856, . . . , received accuracy report M 1858), a phase, frequency and timing accuracy summary table 1860, e.g., generated from the received accuracy reports, a determined "best" sync source 1862, a selected master CBSD (for SYNC) 1864, an address, e.g., IP address, of the selected master CBSD 1866, and a generated message information a particular CBSD that it has been selected to be the master 1868. In some embodiments, the generated message notifying the selected master 1868 may, and sometimes does, include information identifying which particular reported sync source is to be used by the selected master for propagation of sync information to slave CBSDs in the campus network, e.g., when the selected master had previously reported that it had detected more than one alternative sync source which could be used to provide sync information for the campus network. Data/information 1850 further includes a generated message conveying an address, e.g., IP address, of the selected master to be sent to devices, e.g., CBSDs, in the campus network including slave CBSDs. Data/information 1850 further includes sync sources selection parameters, criteria, weighting factors and/or rules, e.g. to be used in selecting the "sync source" and/or the master CBSD. In some embodiments, different weighting factors (e.g., predetermined weighting factors) are associated with the frequency sync accuracy, phase sync accuracy and timing sync accuracy, and a sync source error level value (composite error value) is determined for each reported potential source based on weighted reported values. In some such embodiments, the alternative sync source with the lowest composite error value is selected to be used, and the CBSD which reported that source is selected to be the master. In some embodiments, PAL band sync sources have priority over GAA band sync sources, other conditions being equal. In some embodiments, GAA band sync sources have priority over WISP band sync sources, other conditions being equal. In some embodiments, WISP band sync sources have priority over WiFi sync sources, other conditions being equal.

Figure 18:
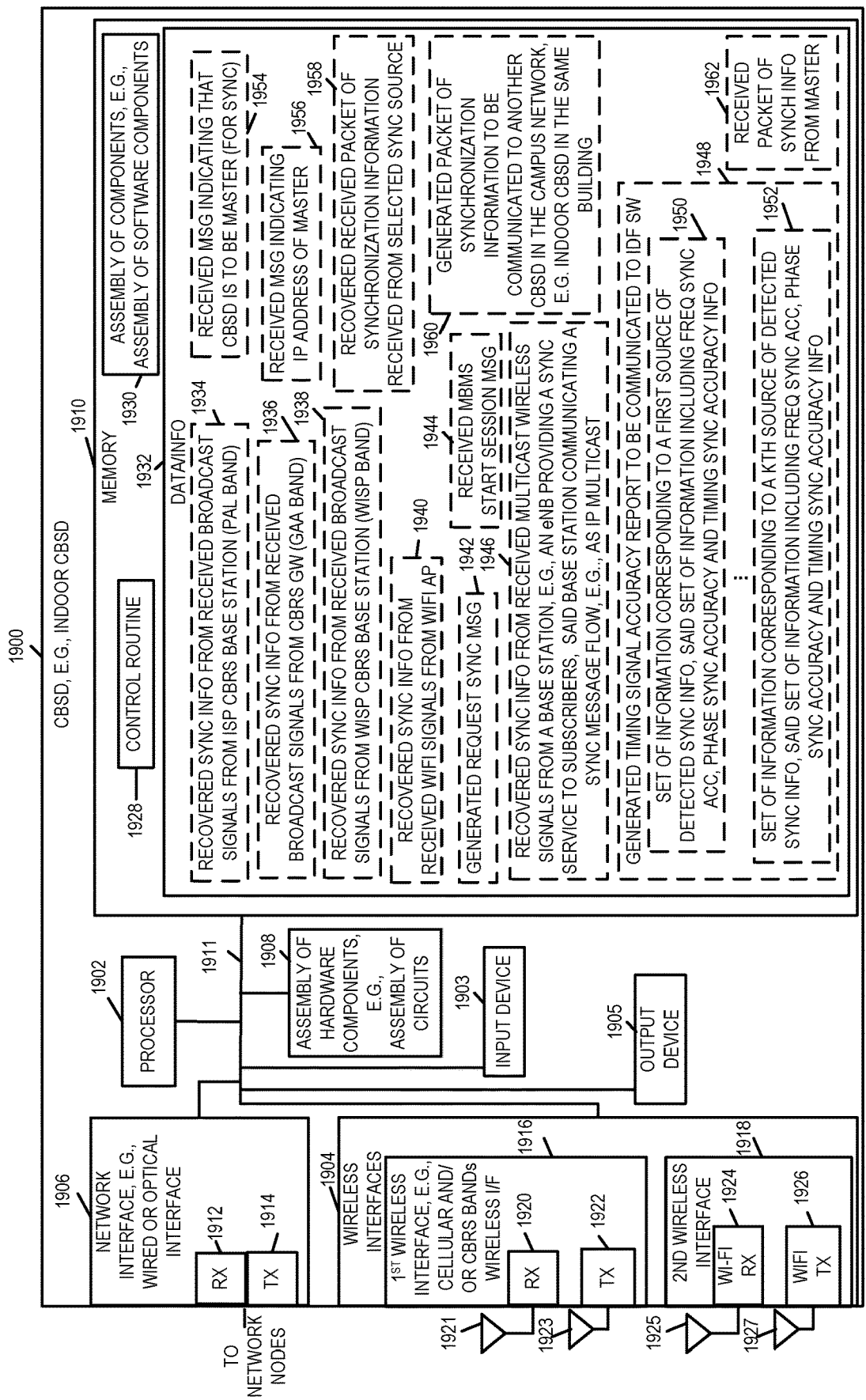
FIG. 18 is a drawing of an CBSD, e.g. an indoor CBSD, implemented in accordance with an exemplary embodiment.

FIG. 18 is a drawing of an exemplary CBSD 1900, e.g. an indoor CBSD, implemented in accordance with an exemplary embodiment. Exemplary CBSD 1900 is, e.g., any of the CBSDs (418, 420, 422, 424, 426, 428, 430, 432, 434, 436, 438, 440, 442, 444, 446, 448, 450, 452, 454, 456) of FIG. 4 and FIG. 9, any of the CBSDs (504, 506, 508, 510, 512) of FIG. 5, any of the CBSDs (1110, 1112, 1114, 1116, 1118, 1120, 1122, 1124, 1126, 1128, 1130) of FIG. 11-14, or any of the CBSDs described with respect to the flowcharts of FIG. 15 (including FIG. 15A, FIG. 15B, FIG. 15C and FIG. 15D) and FIG. 16.

Exemplary CBSD 1900 includes a processor 1902, an input device 1902, e.g., a keyboard or mouse, e.g., a CPU, wireless interfaces 1904, an output device 1905, e.g. a display, a network interface 1906, an assembly of components 1908, e.g., an assembly of components, and memory 1910 coupled together via a bus 1911 over which the various elements may interchange data and information. Wireless interfaces 1904 includes a 1st wireless interface 1916, e.g., a cellular and/or CBRS band(s) wireless interface, including a wireless receiver 1920 coupled to a receive antenna 1921 and a wireless transmitter 1922 coupled to a transmit antenna 1923. Wireless interfaces 1904 further includes a 2nd wireless interface 1918, e.g., a WiFi interface, including a WiFi receiver 1924 coupled to receive antenna 1925 and a WiFi transmitter 1926 coupled to transmit antenna 1927.

Memory 1910 includes control routine 1928, e.g., for controlling the CBSD to perform basic processing and communications functions, and an assembly of components 1930, e.g., an assembly of software components, e.g., software routines and/or software modules configured to control the CBSD 1900 to implement various steps in accordance with an exemplary method, e.g., monitoring for wireless signals conveying sync information, generating timing signal accuracy reports based on received wireless signals from one or more potential sync sources, sending the generated timing signal accuracy reports to an IDF switch, receiving information indicating that the CBSD is to be the master (for the campus network) or receiving information indicating that address of the master CBSD, configuring as a master or slave device with regard to sync information based on received information from the IDF switch, and operating as a master or slave device with regard to sync information.

Memory 1910 further includes data/information 1932. Data/information 1932 may, and sometimes does, include one or more of: recovered sync information from received broadcast signals from an ISP CBRS base station which were communicated in a PAL band 1934, recovered sync information from received broadcast signals from a CBRS GW (e.g., IoT GW or LoRaWAN GW) which were communicated in a GAA band 1936, recovered sync information from received broadcast signals from a WISP CBRS base station which were communicated in a WISP band 1938, recovered sync information for m received WiFi signals from a WiFi AP 1940, a generated request for sync messages 1942, a received MBMS start session message 1944, recovered sync information from received multicast wireless signals from a base station, e.g. an eNB base station communicating a sync message flow, e.g. as IP multicast 1946, and a generated timing signal accuracy report to be communicated to an ID switch 1948. Generated timing signal accuracy report 1948 includes one or more sets of information corresponding to different detected sources of sync (set of information corresponding to a first source of detected sync information, said set of information including frequency sync accuracy information, phase sync accuracy information, and timing sync accuracy information 1950, . . . , set of information corresponding to a Kth source of detected sync information, said set of information including frequency sync accuracy information, phase sync accuracy information, and timing sync accuracy information 1952).

Data/information 1932 may, and sometimes does, include one or more of: a received message indicating the CBSD 1900 is to be the master (for sync) for the campus network 1954, a received message indicating the IP address of the master 1956, a recovered packet of synchronization information received from the selected sync source 1958, e.g., when CBSD 1900 is the master, a generated packet of synchronization information 1960 to be communicated to another CBSD in the campus network, e.g., indoor CBSD in the same building, e.g., when CBSD 1900 is the selected master, and a received packet of sync information 1962 from the master CBSD in the campus network, e.g., when CBSD is a slave in the campus network with regard to sync information.

Figure 19:
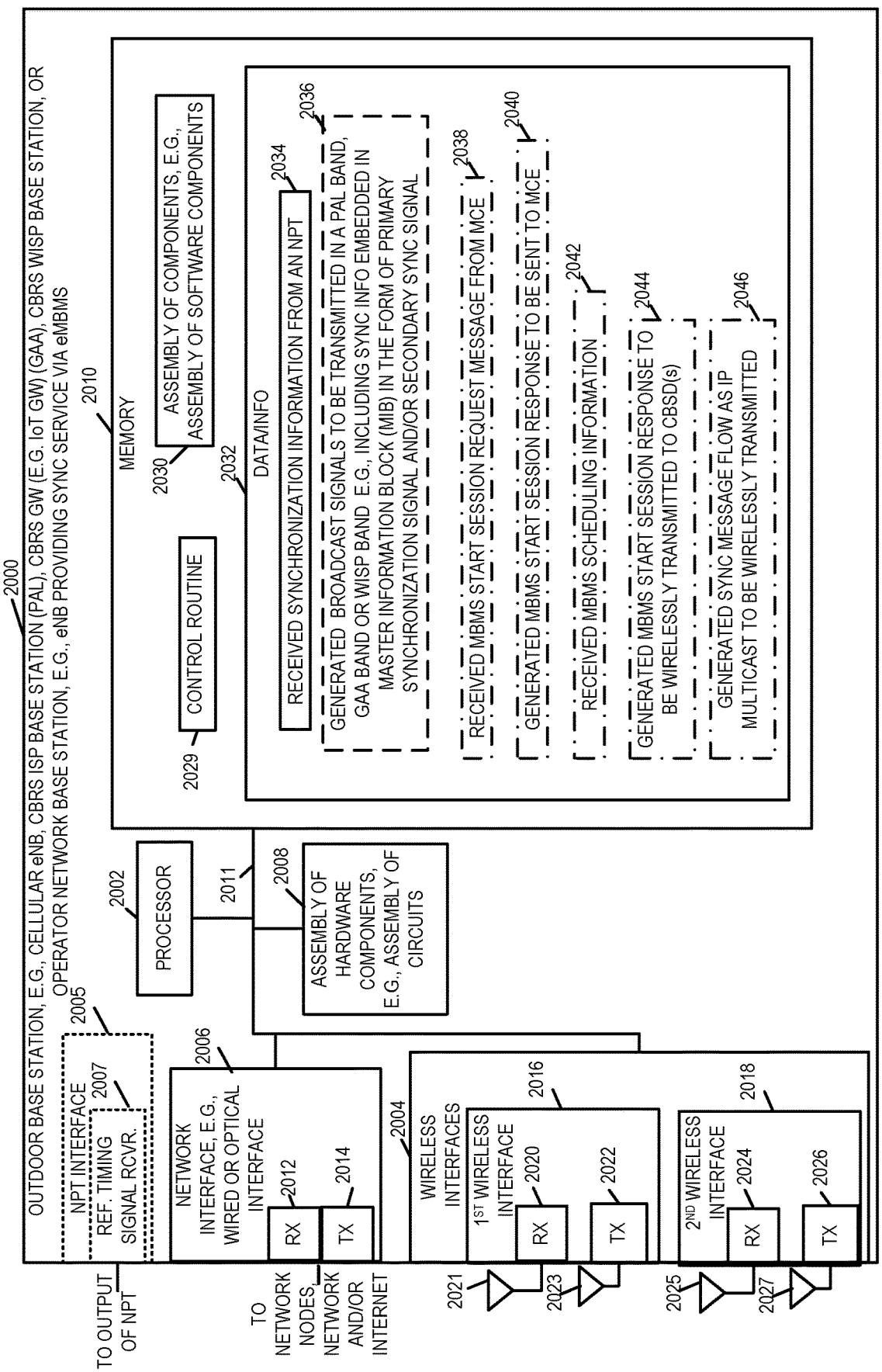
FIG. 19 is a drawing of an exemplary outdoor base station, in accordance with an exemplary embodiment.

FIG. 19 is a drawing of an exemplary outdoor base station 2000, in accordance with an exemplary embodiment. Outdoor base station 2000 is, e.g., a cellular eNB, a CBRS ISP base station using a PAL band, a CBRS GW (e.g., IoT GW) using a GAA band, a CBRS WISP base station using a WISP band, or an operator network base station, e.g., an eNB providing a sync service via eMBMS. Exemplary base station 2000 is, e.g. any of base stations (410, 470, 480) of FIG. 4 or FIG. 9 or FIG. 10, any of the base stations (1140, 1142, 1144, 1146, 1148, 1152, 1154) of FIGS. 11-14, or any of the base stations or GWs in or described with respect to the flowcharts of GWs of FIGS. 15-16.

Base station 2000 includes a processor 2002, e.g., a CPU, wireless interfaces 2004, a network interface 2006, e.g., a wired or optical interface, an assembly of hardware components 2008, e.g., an assembly of components, and memory 2010 coupled together via a bus 2011 over which the various elements may interchange data and information. Wireless interfaces 2004 includes a 1st wireless interface 2016 including a wireless receiver 2020 coupled to a receive antenna 2021 and a wireless transmitter 2022 coupled to a transmit antennas 2023. Wireless interfaces 2004, in some embodiments, includes a 2nd wireless interface 2018 including a wireless receiver 2024 coupled to a receive antenna 2025 and a wireless transmitter 2026 coupled to a transmit antennas 2027. In some embodiments, the first and second wireless interfaces (2016, 2018) correspond to different communications bands and/or different communications technologies. Network interface 2006 includes a receiver 21012 and a transmitter 2014. Network interface 2006 couples the base station 2000 to network nodes and/or the Internet. In some embodiments, the base station 200 includes an NPT interface 2005 including a reference timing signal receiver 2007.

Memory 2010 includes control routine 2029, which controls operation of basic functions of the base station, e.g. memory access control, interfaces control, etc. Memory 2010 further includes assembly of components 2030, e.g. an assembly of software components, e.g. routines and/or software modules, configured to implement steps of an exemplary method in accordance with an exemplary embodiment, e.g. providing sync information to CBSDs in a campus network. Memory 2010 further includes data/information 2032.

Data/information 2032 includes one or more of: received synchronization information from an NPT 2034, generated broadcast signals to be transmitted in a PAL band, a GAA band, or WISP band, e.g., including sync information embedded in master information block (MIB) in the form of primary synchronization signal and/or secondary synchronization signal 2036, received MBMS start session request message from a MCE 2038, a generated MBMS start session response to be sent to a MCE 2040, received MBMS scheduling information 2042, generated MBMS start session response to be wirelessly transmitted to CBSD(s) 2044 and a generated sync message flow as IP multicast to be wirelessly transmitted 2046.

Figure 20A:
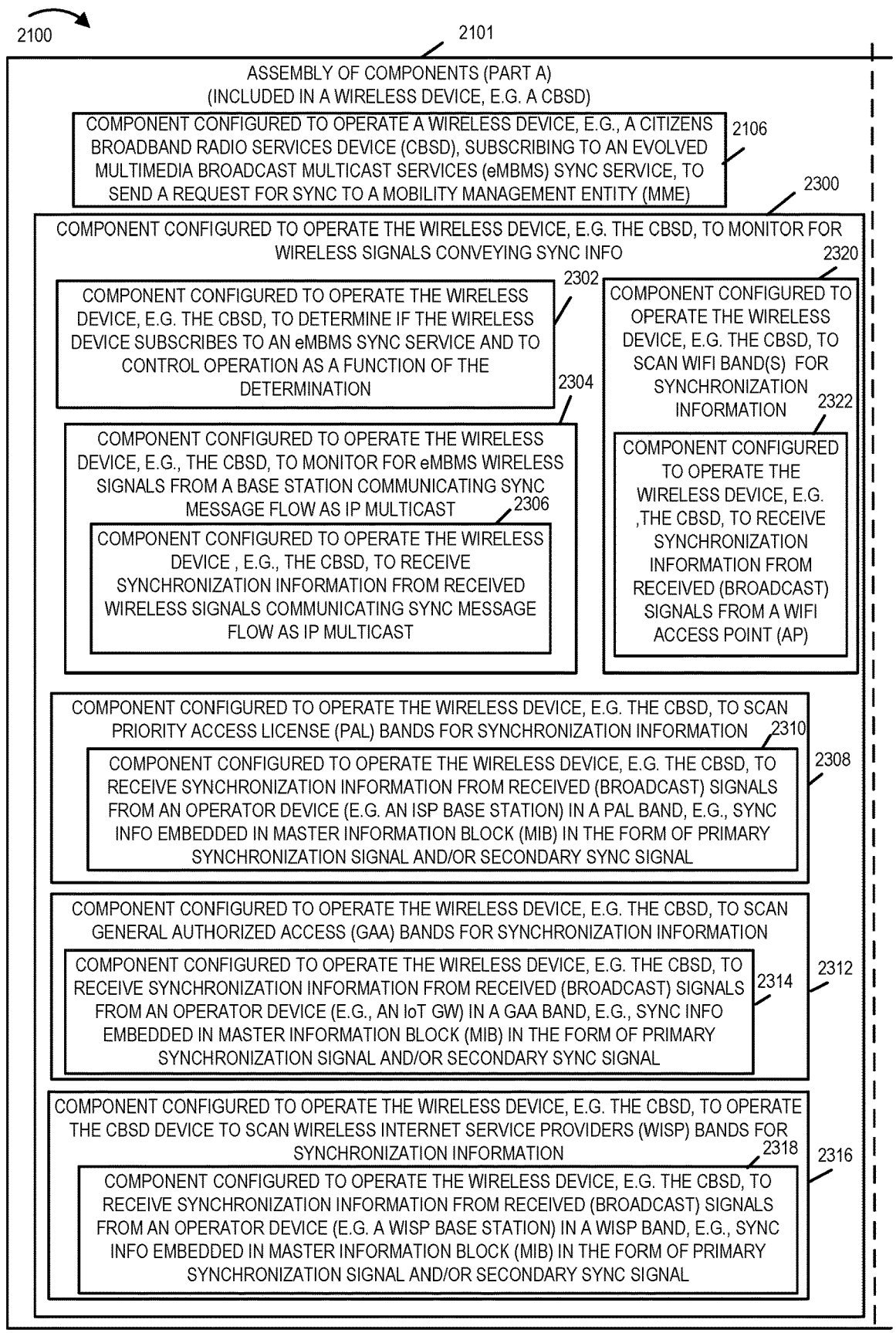
FIG. 20A is a drawing of a first part of an exemplary assembly of components, which may be included in a wireless device, e.g. a CBSD, implemented in accordance with an exemplary embodiment.
Figure 20B:
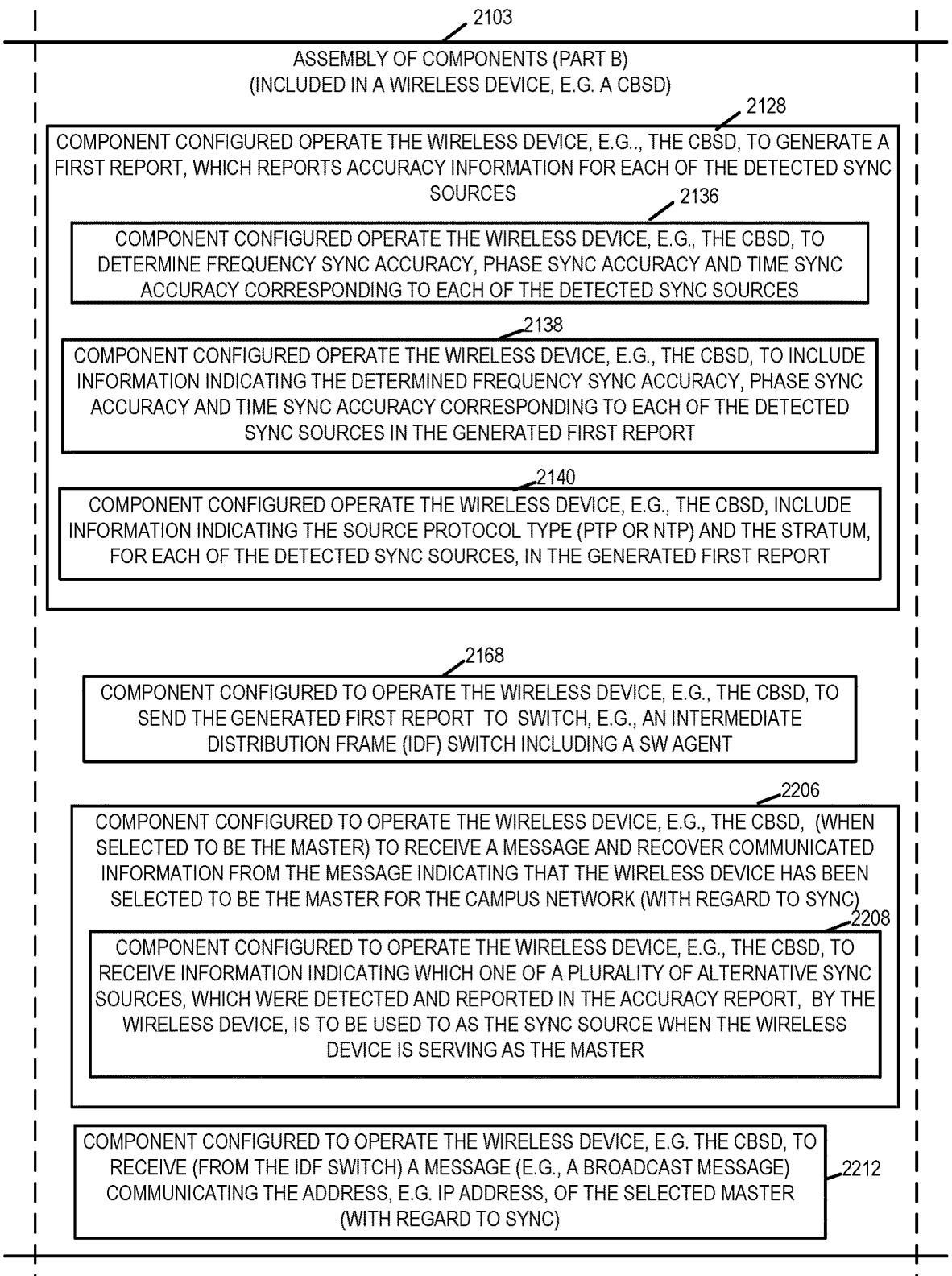
FIG. 20B is a drawing of a second part of an exemplary assembly of components, which may be included in a wireless device, e.g. a CBSD, implemented in accordance with an exemplary embodiment.
Figures 20, 20A, 20B, 20C:
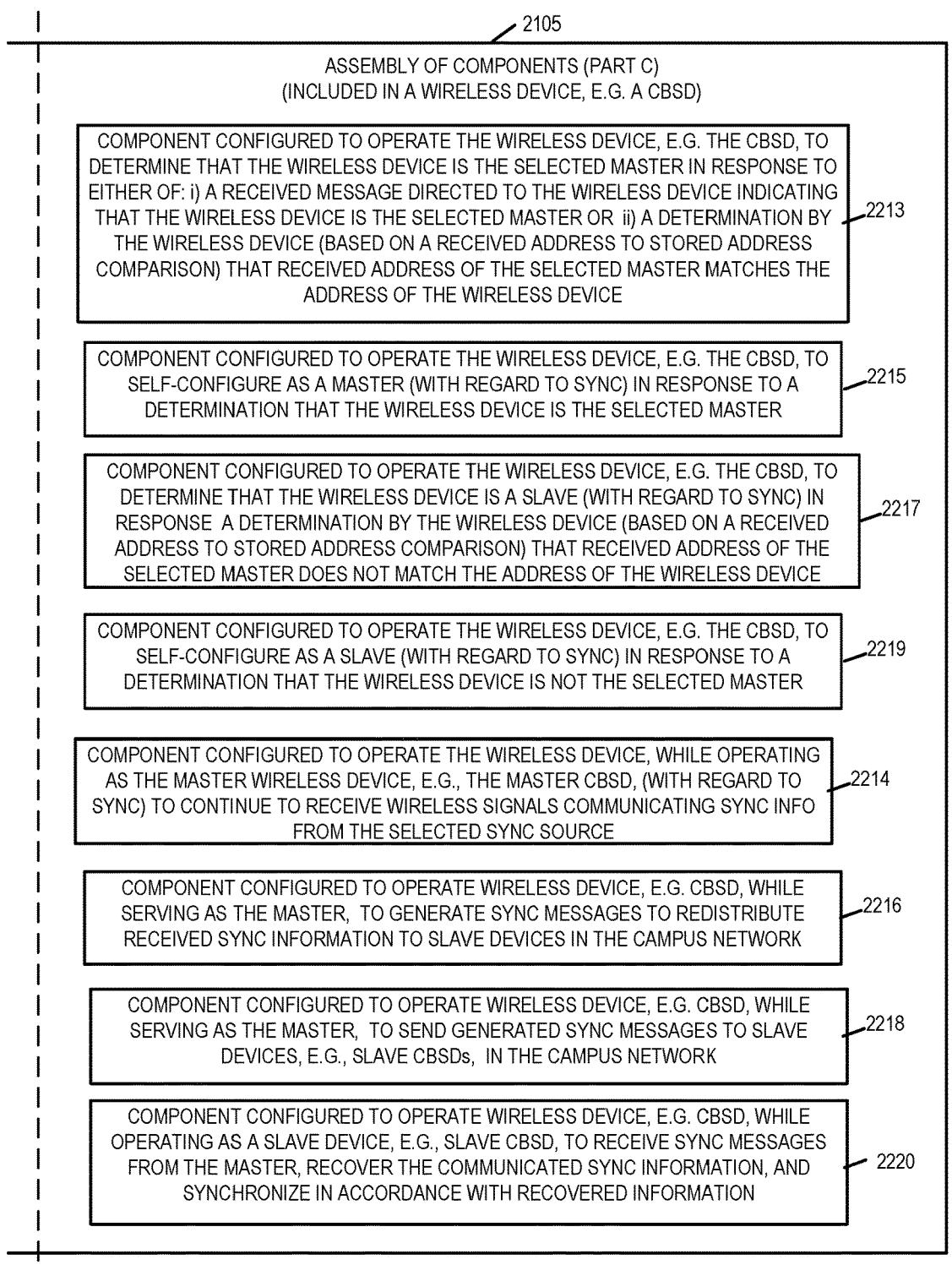
FIG. 20C is a drawing of a third part of an exemplary assembly of components, which may be included in a wireless device, e.g. a CBSD, implemented in accordance with an exemplary embodiment.
FIG. 20 comprises the combination of FIG. 20A, FIG. 20B and FIG. 20C.

FIG. 20, comprising the combination of FIG. 20A, FIG. 20B, FIG. 20C and FIG. 20D, is a drawing of an exemplary assembly of components 2100, comprising the combination of Part A 2101, Part B 2103 and Part C 2105, which may be included in a wireless device, e.g. a CBSD, implemented in accordance with an exemplary embodiment. Assembly of components 2100 is, e.g., included in CBSD 1900 of FIG. 18, in any of the CBSDs (418, 420, 422, 424, 426, 428, 430, 432, 434, 436, 438, 440, 442, 444, 446, 448, 450, 452, 454, 456) of FIG. 4 and FIG. 9, any of the CBSDs (504, 506, 508, 510, 512) of FIG. 5, any of the CBSDs (1110, 1112, 1114, 1116, 1118, 1120, 1122, 1124, 1126, 1128, 1130) of FIG. 11-14, or any of the CBSDs described with respect to the flowcharts of FIG. 15 (including FIG. 15A, FIG. 15B, FIG. 15C and FIG. 15D) and FIG. 16.

The components in the assembly of components 2100 can, and in some embodiments are, implemented fully in hardware within the processor 1902, e.g., as individual circuits. The components in the assembly of components 2100 can, and in some embodiments are, implemented fully in hardware within the assembly of components 1908, e.g., as individual circuits corresponding to the different components. In other embodiments some of the components are implemented, e.g., as circuits, within the processor 1902 with other components being implemented, e.g., as circuits within assembly of components 1908, external to and coupled to the processor 1902. As should be appreciated the level of integration of components on the processor and/or with some components being external to the processor may be one of design choice. Alternatively, rather than being implemented as circuits, all or some of the components may be implemented in software and stored in the memory 1910 of the wireless device, e.g., CBSD, with the components controlling operation of the wireless device, e.g., the CBSD, to implement the functions corresponding to the components when the components are executed by a processor, e.g., processor 1902. In some such embodiments, the assembly of components 2100 is included in the memory 1910 as assembly of components 1930. In still other embodiments, various components in assembly of components 2100 are implemented as a combination of hardware and software, e.g., with another circuit external to the processor 1902 providing input to the processor 1902 which then under software control operates to perform a portion of a component's function. While processor 1902 is shown in the FIG. 18 embodiment as a single processor, e.g., computer, it should be appreciated that the processor 1902 may be implemented as one or more processors, e.g., computers.

When implemented in software the components include code, which when executed by the processor 1902, configure the processor 1902 to implement the function corresponding to the component. In embodiments where the assembly of components 2100 is stored in the memory 1910, the memory 1910 is a computer program product comprising a computer readable medium comprising code, e.g., individual code for each component, for causing at least one computer, e.g., processor 1902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 20 control and/or configure the wireless device 1900, e.g., a CBSD, or elements therein such as the processor 1902, to perform the functions of corresponding steps illustrated and/or described in the method of one or more of the flowcharts, signaling diagrams and/or described with respect to any of the Figures. Thus the assembly of components 2100 includes various components that perform functions of corresponding one or more described and/or illustrated steps of an exemplary method, e.g., steps of the method of flowchart 1500 of FIGS. 15 and 16 and/or described or shown with respect to any of the other figures.

Assembly of components 2100 includes a component 2106 configured to operate a wireless device, e.g., a citizens broadband radio services device (CBSD), subscribing to an evolved multimedia broadcast multicast services (eMBMS) synchronization (SYNC) service to send a request for SYNC to a mobility management entity (MME), and a component 2300 configured to operate the wireless device, e.g., the CBSD, to monitor for wireless signals conveying sync information. Component 2300 includes a component 2302 configured to operate the wireless devices, e.g., the CBSD, to determine if the wireless device subscribes to an eMBMS sync service and to control operation as a function of the determination, a component 2304 configured to operate the wireless device, e.g., the CBSD, to monitor for eMBMS wireless signals from a base station communicating sync message flow as IP multicast. Component 2304 includes a component 2306 configured to operate the wireless devices, e.g., the CBSD, to receive synchronization information from received wireless signals communicating sync message flow as IP multicast. Component 2300 further includes a component 2308 configured to operate the wireless device, e.g. the CBSD, to scan priority access license (PAL) bands for synchronization information, a component 2312 configured to operate the wireless device, e.g. the CBSD, to scan general authorized access (GAA) bands for synchronization information, a component 2316 configured to operate the wireless device, e.g. the CBSD, to scan wireless Internet service provider (WISP) bands for synchronization information, and a component 2320 configured to operate the wireless device, e.g. the CBSD, to scan WiFi bands for synchronization information. Component 2308 includes a component 2310 configured to operate the wireless device, e.g., the CBSD, to receive synchronization information from received (broadcast) signals from an operator device, e.g., an ISP base station, in a PAL band, e.g., receive sync information embedded in master information block (MIB) in the form of primary synchronization signal and/or secondary synchronization signal. Component 2312 includes a component 2314 configured to operate the wireless device, e.g., the CBSD, to receive synchronization information from received (broadcast) signals from an operator device, e.g., an IoT GW or LoRaWAN GW, in a GAA band, e.g., receive sync information embedded in master information block (MIB) in the form of primary synchronization signal and/or secondary synchronization signal. Component 2316 includes a component 2318 configured to operate the wireless device, e.g., the CBSD, to receive synchronization information from received (broadcast) signals from an operator device, e.g., WISP base station, e.g., receive sync information embedded in master information block (MIB) in the form of primary synchronization signal and/or secondary synchronization signal. Component 2320 includes a component 2322 configured to Component 2312 includes a component 2314 configured to operate the wireless device, e.g., the CBSD, to receive synchronization information from received (broadcast) signals from a WiFi access point (AP).

Assembly of components 2100 further includes a component 2128 configured to operate the wireless device, e.g., the CBSD, to generate a first (timing signal accuracy) report which reports accuracy information, e.g., frequency sync accuracy information, phase sync accuracy information and timing sync accuracy information, for each of the detected sync sources which were detected by the wireless device, e.g., CBSD. In various embodiments, the generated accuracy report further includes one or both of source protocol information and stratum information for each of the detected sources. In some embodiments the generated accuracy report includes source identification information, e.g. information identifying the source of the detected wireless sync signals, e.g., information identifying the source network, information identifying the band, e.g. PAL, GAA, WISP or WiFi corresponding to the source, information identifying the source base station, GW or AP, which transmitted the wireless signals conveying sync information which were detected by the wireless device, e.g. CBSD. In some embodiments, the generated accuracy report further includes information, e.g., an IP address, identifying the wireless device, e.g., the CBSD, which detected the wireless signals conveying sync information and generated the timing signal accuracy report. In some embodiments, a single timing signal accuracy report from a wireless device, e.g. a CBSD, may, and sometimes does, include multiple sets of information, e.g., each set of information corresponding to a different one of a plurality of different source signals which were detected by the wireless terminal. Component 2128 includes a component 2136 configured to operate the wireless device, e.g., the CBSD, to determine frequency sync accuracy, phase sync accuracy and time sync accuracy corresponding to each of the detected sync sources, a component 2138 configured to operate the wireless device, e.g., the CBSD, to include information indicating he determined frequency sync accuracy, determined phase sync accuracy and determined time sync accuracy corresponding to each of the detected sync sources in the generated first report, and a component 2140 configured to operate the wireless device, e.g., the CBSD, to include information indicating the source protocol type (e.g., PTP or NTP) and the stratum for each of the detected sync sources, in the generated report. In various embodiments, source identification information, corresponding to each of the detected sync sources, is further includes in the generated accuracy report, e.g., as part of the operations of component 2128.

Assembly of components 2100 further includes a component 2168 configured to operate the wireless device, e.g., the CBSD, to send the generated first (timing signal) accuracy report to a switch, e.g., an intermediate distribution frame (IDF) switch including a software (SW) agent.

Assembly of components 2100 further includes a component 2206 configured to operate the wireless device, e.g., the CBSD, (when selected to be the master) to receive a message and recover communicated information from the message indicating that the wireless device has been selected to be the master (with regard to sync) for the campus network. Component 2206 may, and sometimes does, includes a component 2208 configured to operate the wireless device, e.g. the CBSD, to receive information indicating which one of a plurality of alternative sync sources, which were detected and reported in the accuracy report, by the wireless device is to be used as the sync source when the wireless device is serving as the master (with regard to sync).

Assembly of components 2100 further includes a component 2212 configured to operate the wireless device, e.g., the CBSD, to receive, e.g., from the IDF switch, a message, e.g., a broadcast message communicating the address, e.g., the IP address of the selected master (with regard to sync), a component 2213 configured to operate the wireless device, e.g. the CBSD, to determine that the wireless device is the selected master in response to wither of: i) a received message directed to the wireless device indicating that the wireless device is the selected master or ii) a determination by the wireless device (based on a received address to a stored address comparison) that the received address, e.g. IP address, of the selected master matches the stored address of the wireless device, a component 2215 configured to operate the wireless device, e.g. the CBSD, to self-configured as a master (with regard to sync) in response to a determination that the wireless device is the selected master, a component 2217 configured to operate the wireless device, e.g., the CBSD, to determine that the wireless device is a slave (with regard to sync) in response to a determination by the wireless device (based on a received address to a stored address comparison) that the received address, e.g. IP address, of the selected master does not match the stored address of the wireless device, and a component 2219 configured to operate the wireless device, e.g. the CBSD, to self-configured as a slave (with regard to sync) in response to a determination that the wireless device is not the selected master.

Figure 21A:
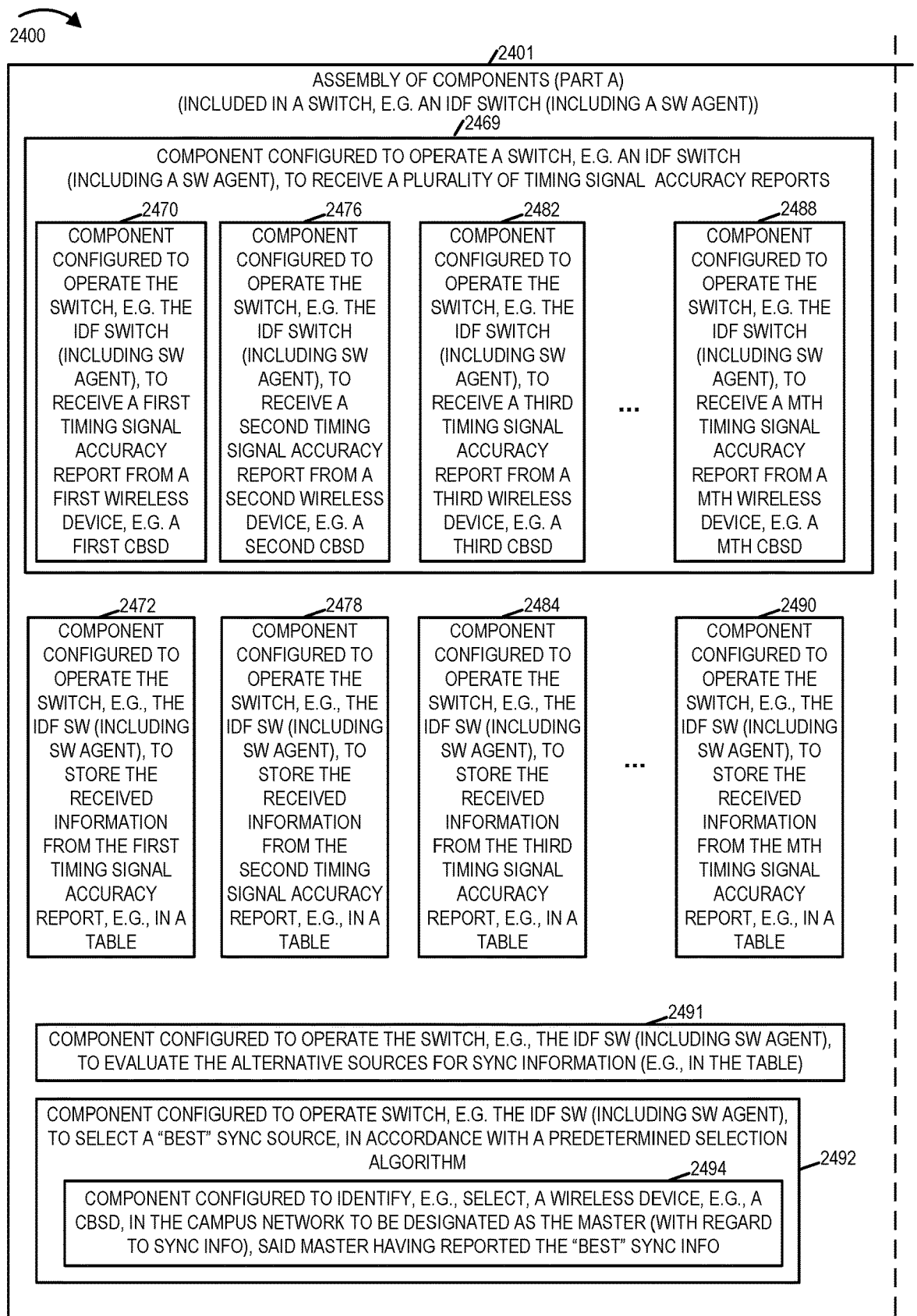
FIG. 21A is a drawing of a first part of an exemplary assembly of components, which may be included in a switch, e.g. an intermediate distribution frame (IDF) switch including a software (SW) agent, implemented in accordance with an exemplary embodiment.
Figures 21, 21A, 21B:
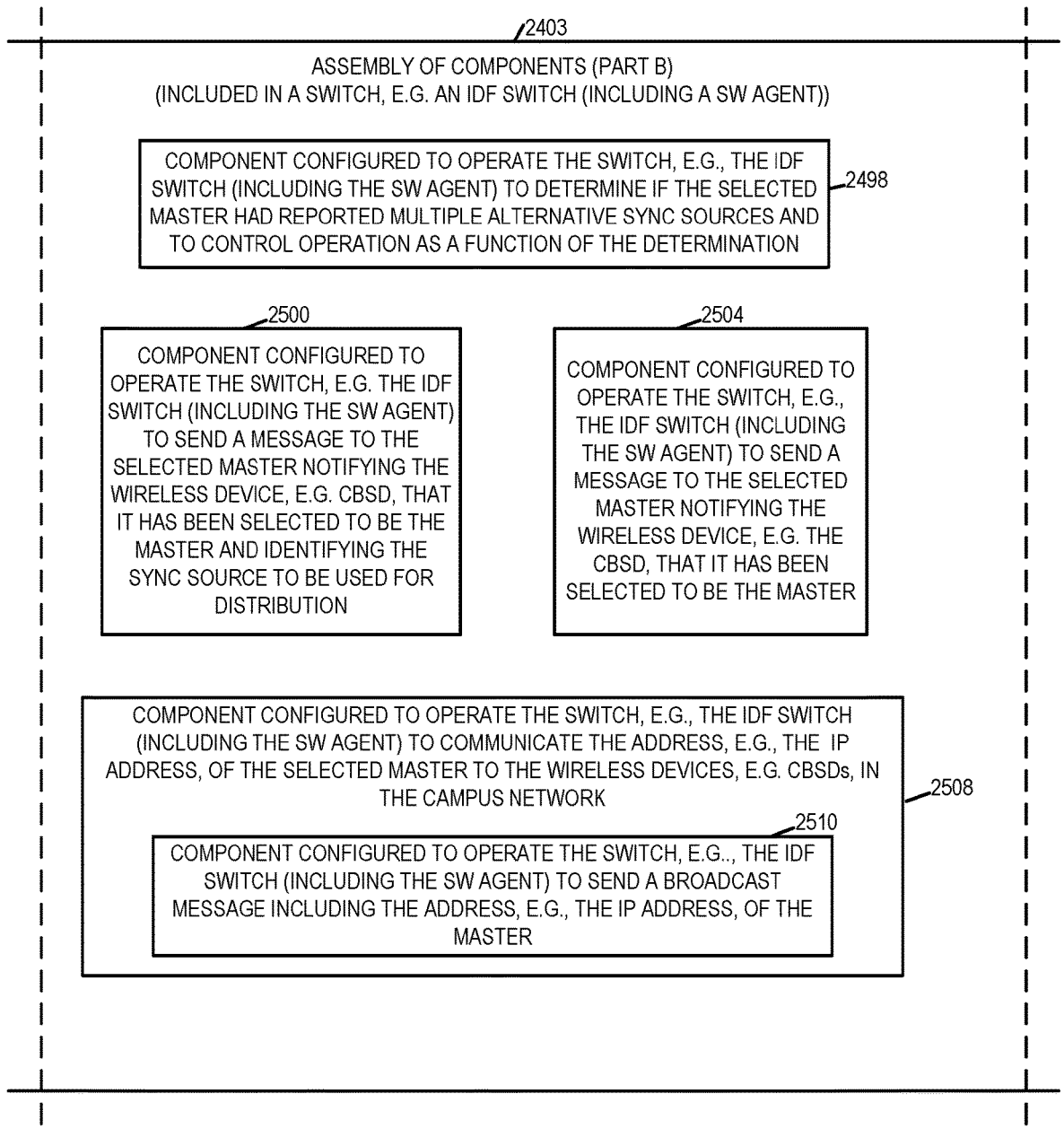
FIG. 21B is a drawing of a second part of an exemplary assembly of components, which may be included in a switch, e.g. an intermediate distribution frame (IDF) switch including a software (SW) agent, implemented in accordance with an exemplary embodiment.
FIG. 21 comprises the combination of FIG. 21A and FIG. 21B.

Assembly of components 2100 further includes a component 2214 configured to operate the wireless device, which operating as the master wireless devices, e.g. the master CBSD, (with regard to sync) to continue to receive wireless signals communicating sync information from the selected sync source, a component 2216 configured to operate the wireless device, e.g., CBSD, which serving as the master, to generate sync messages to redistribute received sync information to slave devices in the campus network, a component 2218 configured to operate the wireless device, e.g. the CBSD, to send generate sync message to slave devices, e.g., slave CBSDs, in the campus network, and a component 2220 configured to operate the wireless device, e.g. the CBSD, while operating as a slave device, e.g., a slave CBSD, to receive sync message from the master, recover communicated sync information and synchronize in accordance with the recovered information FIG. 21, comprising the combination of FIG. 21A and FIG. 21B, is a drawing of an exemplary assembly of components 2400, comprising Part A 2401 and Part B 2403, which may be included in a switch, e.g. an intermediate distribution frame (IDF) switch including a software (SW) agent, implemented in accordance with an exemplary embodiment. Assembly of components 2400 is, e.g., included in IDF switch 1700, in any of IDF switch 416 of FIG. 4 or FIG. 9, IDF switch 415 of FIG. 4 or FIG. 9, IDF switch 414 of FIG. 4 or FIG. 9, IDF switch 412 of FIG. 4 or FIG. 9, IDF switch 502 of FIG. 5, IDF switch 1106 of FIGS. 11-14, or the IDF switch described with respect to the flowcharts of FIG. 15 (including FIG. 15A, FIG. 15B, FIG. 15C and FIG. 15D) and FIG. 16.

The components in the assembly of components 2400 can, and in some embodiments are, implemented fully in hardware within the processor 1802, e.g., as individual circuits. The components in the assembly of components 2400 can, and in some embodiments are, implemented fully in hardware within the assembly of components 1808, e.g., as individual circuits corresponding to the different components. In other embodiments some of the components are implemented, e.g., as circuits, within the processor 1802 with other components being implemented, e.g., as circuits within assembly of components 1808, external to and coupled to the processor 1802. As should be appreciated the level of integration of components on the processor and/or with some components being external to the processor may be one of design choice.

Alternatively, rather than being implemented as circuits, all or some of the components may be implemented in software and stored in the memory 1810 of the switch, e.g., IDF switch, with the components controlling operation of the switch, e.g., the IDF switch, to implement the functions corresponding to the components when the components are executed by a processor, e.g., processor 1802. In some such embodiments, the assembly of components 2400 is included in the memory 1810 as assembly of components 1852. In still other embodiments, various components in assembly of components 2400 are implemented as a combination of hardware and software, e.g., with another circuit external to the processor 1802 providing input to the processor 1802 which then under software control operates to perform a portion of a component's function. While processor 1802 is shown in the FIG. 17 embodiment as a single processor, e.g., computer, it should be appreciated that the processor 1802 may be implemented as one or more processors, e.g., computers. When implemented in software the components include code, which when executed by the processor 1802, configure the processor 1802 to implement the function corresponding to the component. In embodiments where the assembly of components 2400 is stored in the memory 1810, the memory 1810 is a computer program product comprising a computer readable medium comprising code, e.g., individual code for each component, for causing at least one computer, e.g., processor 1802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 21 control and/or configure the switch 1800, e.g., an IDF switch, or elements therein such as the processor 1802, to perform the functions of corresponding steps illustrated and/or described in the method of one or more of the flowcharts, signaling diagrams and/or described with respect to any of the Figures. Thus the assembly of components 2400 includes various components that perform functions of corresponding one or more described and/or illustrated steps of an exemplary method, e.g., steps of the method of flowchart 1500 of FIG. 15 and/or described or shown with respect to any of the other figures.

Assembly of components 2400 includes a component 2469 configured to operate a switch, e.g., an IDF switch (including a SW agent), to receive a plurality of timing signal accuracy reports, e.g. from wireless devices, e.g., CBSDs, in a campus network, which were able to detect wireless signals communicating sync information in one or more bands. Component 2469 includes a component 2470 configured to operate the switch, e.g., the IDF switch (including the SW agent), to receive a first timing signal accuracy report from a first wireless device, e.g., a first CBSD, a component 2476 configured to operate the switch, e.g., the IDF switch (including the SW agent), to receive a second timing signal accuracy report from a second wireless device, e.g., a second CBSD, a component 2482 configured to operate the switch, e.g., the IDF switch (including the SW agent), to receive a third timing signal accuracy report from a third wireless device, e.g., third CBSD, and includes a component 2488 configured to operate the switch, e.g., the IDF switch (including the SW agent), to receive a Mth timing signal accuracy report from a Mth wireless device, e.g., a Mth CBSD.

Assembly of components 2400 further includes a component 2472 configured to operate the switch, e.g. the IDF switch (including the SE agent), to store received information from the first timing signal accuracy report, e.g., in a phase, frequency and timing accuracy summary table, a component 2478 configured to operate the switch, e.g. the IDF switch (including the SE agent), to store received information from the second timing signal accuracy report, e.g., in the phase, frequency and timing accuracy summary table, a component 2482 configured to operate the switch, e.g. the IDF switch (including the SE agent), to store received information from the third timing signal accuracy report, e.g., in the phase, frequency and timing accuracy summary table, and a component 2490 configured to operate the switch, e.g. the IDF switch (including the SE agent), to store received information from the Mth timing signal accuracy report, e.g., in the phase, frequency and timing accuracy summary table.

Assembly of components 2400 further includes a component 2491 configured to operate the switch, e.g., the IDF switch (including the SW agent), to evaluate alternative sources for sync information, e.g. evaluate the alternative sources in the generated table. IN some embodiments, the evaluation of step 2491 includes disregarding some detected source with an insufficient level of accuracy. In some embodiments, evaluating a source includes generating an overall accuracy quality value for the source, e.g., based on a received accuracy values for frequency sync, phase sync, and time sync (from the report) and predetermined weighting values used to scale the reported values.

Assembly of components 2400 further includes a component 2492 configured to operate the switch, e.g. the IDF switch (including the SW agent), to select a "best" sync source, in accordance with a predetermined selection algorithm. In some embodiments, the selection algorithm favors PAL band sources over GAA sources, and GAA sources over WISP sources, and Wisp sources over WiFi sources.

Component 2492 includes a component 2492 configured to identify, e.g., a select, a wireless device, e.g. a CBSD, in the campus network to be designated as the master (with regard to sync info), said master having reported the "best" sync information.

Assembly of components 2400 further includes a component 2498 configured to operate the switch, e.g., the IDF switch (including the SW agent) to determine if the selected master had reported multiple alternative sync sources and to control operation as a function of the determination, a component 2500 configured to operate the switch, e.g. the IDF switch (including the SW agent), to send a message to selected master notifying the wireless device, e.g., the CBSD, that it has been selected to be the master and identifying the sync source to be used for distribution, a component 2504 configured to operate the switch, e.g. the IDF switch (including the SW agent), to send a message to selected master notifying the wireless device, e.g., the CBSD, that it has been selected to be the master.

Assembly of components 2500 further includes a component 2508 configured to operate the switch, e.g. the IDF switch (including the SW agent) to communicate the address, e.g. the IP address, of the selected master to the wireless devices, e.g., CBSDS, in the campus network. Component 2508 includes a component 2510 configured to operate the switch, e.g., the IDF switch (including the SW agent) to send a broadcast message including the address, e.g., IP address of the master (with regard to sync).

Numbered List of Exemplary Method Embodiments

Method Embodiment 1 A method for providing access to timing information, the method comprising: operating a switch (e.g., IDF switch) to receive (1569) a plurality of timing signal accuracy reports, from a plurality of wireless devices (CBSD 1, CBSD 2, CBSD 3, CBSD M), the plurality of timing signal accuracy reports including a first timing signal accuracy report sent from a first wireless device (CBSD 1) and a second timing signal accuracy report sent from a second wireless device (CBSD 2); operating the switch to select (1592 including step 1594) one (CBSD 1) of the wireless devices (CBSD 1, CBSD 2, CBSD 3, CBSDM) from which a timing signal accuracy report was received to act as a timing signal master device; and operating the switch to communicate (1608) an address (e.g., IP address) of the timing signal master device (CBSD 1) to devices (CBSD 2, CBSD 3, CBSD 4, . . . , CBSD M) which use timing synchronization information (e.g., wireless devices and/or other devices).

Method Embodiment 2 The method of Method Embodiment 1, wherein said devices (CBSD 2, CBSD 3, CBSD 4, . . . CBSD M) which use timing synchronization information are other devices in a network (e.g., a campus network 1102) in which the master device (CBSD 1) is located.

Method Embodiment 3 The method of Method Embodiment 2, wherein said devices (CBSD 2, CBSD 3, CBSD 4, . . . CBSD M) which use timing synchronization information include a plurality of CBSDs located at different locations within a building (409) in which the timing signal master device (CBSD 1) and the switch are located.

Method Embodiment 4 The method of Method Embodiment 1, further comprising: operating (1592) the switch to select a sync source (e.g., best sync source) from among a plurality of alternative reported sync sources (e.g., each timing accuracy report sent from a CBSD to the IDF switch reports a set of accuracy information (freq accuracy info, phase accuracy info, time accuracy info) for each of one or more sync sources which were detected by the monitoring (scanning) of the CBSD).

Method Embodiment 5 The method of Method Embodiment 1, further comprising: operating the switch (e.g., IDF switch) to send (1600 or 1604) a timing master designation message to the selected wireless device which is to act as the timing signal master device.

Method Embodiment 6 The method of Method Embodiment 5, wherein said timing master designation message includes information indicating (1600) a selected sync source to be used by the timing signal master device for distribution of timing signal information.

Method Embodiment 7 The method of Method Embodiment 5, said selected sync source to be used by the timing signal master is one of a plurality of sync sources which were identified in a timing signal accuracy report sent by the timing signal master device to the switch.

Method Embodiment 8 The method of Method Embodiment 1, further comprising: operating the timing signal master device to generate (1616) sync messages based on timing information received from a selected sync source to be used by the timing signal master device for distribution of timing signal information.

Method Embodiment 9 The method of Method Embodiment 4, further comprising: operating the switch to send (1600) a timing master designation message to the selected wireless device indicating that the selected wireless device is the timing signal master device.

Method Embodiment 10 The method of Method Embodiment 8, further comprising: operating the first wireless device to monitor (1518 or 1700) for wireless signals conveying sync information, said monitoring including monitoring for one or more of: i) evolved Multimedia Broadcast Multicast Service (eMBMS) wireless signals communicating sync information in an IP multicast; ii) WIFI synchronization signals; iii) priority access license (PAL) band synchronization signals; iv) general authorized access band synchronization signals and v) Wireless Internet Service Providers (WISP) signals.

Method Embodiment 11 The method of Method Embodiment 10, further comprising: operating the first wireless device to activate (1504) one or more synchronization services prior to monitoring (1518 or 1700) for wireless signals conveying sync information.

Method Embodiment 12 The method of Method Embodiment 11, wherein operating the first wireless device to activate (1504) one or more synchronization services prior to monitoring (1518 or 1700) for wireless signals conveying sync information includes operating the first wireless device (e.g., a first CBSD) to send (1506) a request for synchronization to a mobility management entity (MME).

Method Embodiment 13 The method of Method Embodiment 8, wherein operating the first wireless device to monitor (1518 or 1700) for wireless signals conveying sync information includes operating the first wireless device to monitor at least three of: i) eMBMS wireless signals communicating sync information in an IP multicast; ii) WIFI synchronization signals; iii) priority access license (PAL) band synchronization signals; iv) general authorized access band synchronization signals and v) Wireless Internet Service Providers (WISP) signals.

Method Embodiment 14 The method of Method Embodiment 4, wherein said plurality of timing signal accuracy reports includes a first timing signal accuracy report (1202 or 1230 or 718) including: information (702) identifying one or more timing signal sources detected by the first wireless device, said one or more timing signal sources detected by the first wireless device including a first timing signal source, said first timing signal accuracy report (718) including for the first timing signal source one or more of: i) frequency synchronization accuracy information (708), ii) phase synchronization accuracy information (710), iii) timing synchronization accuracy information (712), iv) source protocol information (714) and v) stratum information (716).

Method Embodiment 15 The method of Method Embodiment 14 wherein the first timing signal accuracy report includes at least two of: i) frequency synchronization accuracy information (708), ii) phase synchronization accuracy information (710), iii) timing synchronization accuracy information (712), iv) source protocol information (714) and v) stratum information (716).

Method Embodiment 16 The method of Method Embodiment 14 wherein the first timing signal accuracy report (718) includes at least three of: i) frequency synchronization accuracy information (708), ii) phase synchronization accuracy information (710), iii) timing synchronization accuracy information (712), iv) source protocol information (714) and v) stratum information (716).

Method Embodiment 17 The method of Method Embodiment 14 wherein the first timing signal accuracy report (718) includes four or all of: i) frequency synchronization accuracy information (708), ii) phase synchronization accuracy information (710), iii) timing synchronization accuracy information (712), iv) source protocol information (714) and v) stratum information (716).

Method Embodiment 18 The method of Method Embodiment 14, wherein said first timing signal accuracy report (1230) includes: information identifying two or more timing signal sources detected by the first wireless device, said two or more timing signal sources detected by the first wireless device including said first timing signal source and a second timing signal source, said first timing signal accuracy report including for the second timing signal source one or more of: i) frequency synchronization accuracy information, ii) phase synchronization accuracy information, iii) timing synchronization accuracy information, iv) source protocol information and v) stratum information.

Method Embodiment 19 The method of Method Embodiment 4, wherein operating (1592) the switch to select a sync source (e.g., best sync source) from among a plurality of alternative reported sync sources includes selecting a PAL source over a GAA source, when reported accuracy is equivalent with respect to the highest accuracy reported PAL source and the highest accuracy reported GAA source.

Method Embodiment 20 The method of Method Embodiment 4, wherein operating (1592) the switch to select a sync source (e.g., best sync source) from among a plurality of alternative reported sync sources includes selecting a GAA source over a WISP source, when reported accuracy is equivalent with respect to the highest accuracy reported GAA source and the highest accuracy reported WISP source.

Method Embodiment 21 The method of Method Embodiment 4, wherein operating (1592) the switch to select a sync source (e.g., best sync source) from among a plurality of alternative reported sync sources includes selecting a WISP source over a WiFi source, when reported accuracy is equivalent with respect to the highest accuracy reported WISP source and the highest accuracy reported WiFi source.

Method Embodiment 22 The method of Method Embodiment 4, wherein a WiFi source is only selected as the sync source (e.g., best sync source) when other (non-WiFi) sources (e.g., PAL, GAA, WISP sources) have not been reported.

Numbered List of Exemplary System Embodiments

System Embodiment 1 A system for providing access to timing information, the system comprising: a switch (e.g., IDF switch 1106 or 1800) including a first processor (1802) configured to: operate the switch (e.g., IDF switch) to receive (1569) a plurality of timing signal accuracy reports, from a plurality of wireless devices (CBSD 1, CBSD 2, CBSD 3, CBSD M), the plurality of timing signal accuracy reports including a first timing signal accuracy report sent from a first wireless device (CBSD 1) and a second timing signal accuracy report sent from a second wireless device (CBSD 2); operate the switch to select (1592 including step 1594) one (CBSD 1) of the wireless devices (CBSD 1, CBSD 2, CBSD 3, CBSDM) from which a timing signal accuracy report was received to act as a timing signal master device; and operate the switch to communicate (1608) an address (e.g., IP address) of the timing signal master device (CBSD 1) to devices (CBSD 2, CBSD 3, CBSD 4, . . . , CBSD M) which use timing synchronization information (e.g., wireless devices and/or other devices).

System Embodiment 2 The system of System Embodiment 1, wherein said devices (CBSD 2, CBSD 3, CBSD 4, . . . CBSD M) which use timing synchronization information are other devices in a network (e.g., a campus network 1102) in which the master device (CBSD 1) is located.

System Embodiment 3 The system of System Embodiment 2, wherein said devices (CBSD 2, CBSD 3, CBSD 4, . . . CBSD M) which use timing synchronization information include a plurality of CBSDs located at different locations within a building (409) in which the timing signal master device (CBSD 1) and the switch are located.

System Embodiment 4 The system of System Embodiment 1, wherein said first processor (1802) is further configured to: operate (1592) the switch to select a sync source (e.g., best sync source) from among a plurality of alternative reported sync sources (e.g., each timing accuracy report sent from a CBSD to the IDF switch reports a set of accuracy information (freq accuracy info, phase accuracy info, time accuracy info) for each of one or more sync sources which were detected by the monitoring (scanning) of the CBSD).

System Embodiment 5 The system of System Embodiment 1, wherein said first processor (1802) is further configured to: operate the switch (e.g., IDF switch) to send (1600 or 1604) a timing master designation message to the selected wireless device which is to act as the timing signal master device.

System Embodiment 6 The system of System Embodiment 5, wherein said timing master designation message includes information indicating (1600) a selected sync source to be used by the timing signal master device for distribution of timing signal information.

System Embodiment 7 The system of System Embodiment 5, said selected sync source to be used by the timing signal master is one of a plurality of sync sources which were identified in a timing signal accuracy report sent by the timing signal master device to the switch.

System Embodiment 8 The system of System Embodiment 1, further comprising: said first wireless device (first CBSD 1110 or 1900) including a second processor (1902), said first wireless device being the selected timing signal master device, and wherein said second processor (1902) is configured to: operate the timing signal master device to generate (1616) sync messages based on timing information received from a selected sync source to be used by the timing signal master device for distribution of timing signal information.

System Embodiment 9 The system of System Embodiment 4, wherein said first processor (1802) is configured to: operate the switch to send (1600) a timing master designation message to the selected wireless device indicating that the selected wireless device is the timing signal master device.

System Embodiment 10 The system of System Embodiment 8, wherein said second processor (1902) is configured to: operate the first wireless device to monitor (1518 or 1700) for wireless signals conveying sync information, said monitoring including monitoring for one or more of: i) evolved Multimedia Broadcast Multicast Service (eMBMS) wireless signals communicating sync information in an IP multicast; ii) WIFI synchronization signals; iii) priority access license (PAL) band synchronization signals; iv) general authorized access band synchronization signals and v) Wireless Internet Service Providers (WISP) signals.

System Embodiment 11 The system of System Embodiment 10, wherein said second processor (1902) is further configured to: operate the first wireless device to activate (1504) one or more synchronization services prior to monitoring (1518 or 1700) for wireless signals conveying sync information.

System Embodiment 12 The system of System Embodiment 11, wherein operating the first wireless device to activate (1504) one or more synchronization services prior to monitoring (1518 or 1700) for wireless signals conveying sync information includes operating the first wireless device (e.g., a first CBSD) to send (1506) a request for synchronization to a mobility management entity (MME).

System Embodiment 13 The system of System Embodiment 8, wherein operating the first wireless device to monitor (1518 or 1700) for wireless signals conveying sync information includes operating the first wireless device to monitor at least three of: i) eMBMS wireless signals communicating sync information in an IP multicast; ii) WIFI synchronization signals; iii) priority access license (PAL) band synchronization signals; iv) general authorized access band synchronization signals and v) Wireless Internet Service Providers (WISP) signals.

System Embodiment 14 The system of System Embodiment 4, wherein said plurality of timing signal accuracy reports includes a first timing signal accuracy report (1202 or 1230 or 718) including: information (702) identifying one or more timing signal sources detected by the first wireless device, said one or more timing signal sources detected by the first wireless device including a first timing signal source, said first timing signal accuracy report (718) including for the first timing signal source one or more of: i) frequency synchronization accuracy information (708), ii) phase synchronization accuracy information (710), iii) timing synchronization accuracy information (712), iv) source protocol information (714) and v) stratum information (716).

System Embodiment 15 The system of System Embodiment 14 wherein the first timing signal accuracy report includes at least two of: i) frequency synchronization accuracy information (708), ii) phase synchronization accuracy information (710), iii) timing synchronization accuracy information (712), iv) source protocol information (714) and v) stratum information (716).

System Embodiment 16 The system of System Embodiment 14 wherein the first timing signal accuracy report (718) includes at least three of: i) frequency synchronization accuracy information (708), ii) phase synchronization accuracy information (710), iii) timing synchronization accuracy information (712), iv) source protocol information (714) and v) stratum information (716).

System Embodiment 17 The system of System Embodiment 14 wherein the first timing signal accuracy report (718) includes four or all of: i) frequency synchronization accuracy information (708), ii) phase synchronization accuracy information (710), iii) timing synchronization accuracy information (712), iv) source protocol information (714) and v) stratum information (716).

System Embodiment 18 The system of System Embodiment 14, wherein said first timing signal accuracy report (1230) includes: information identifying two or more timing signal sources detected by the first wireless device, said two or more timing signal sources detected by the first wireless device including said first timing signal source and a second timing signal source, said first timing signal accuracy report including for the second timing signal source one or more of: i) frequency synchronization accuracy information, ii) phase synchronization accuracy information, iii) timing synchronization accuracy information, iv) source protocol information and v) stratum information.

System Embodiment 19 The system of System Embodiment 4, wherein operating (1592) the switch to select a sync source (e.g., a best sync source) from among a plurality of alternative reported sync sources includes selecting a PAL source over a GAA source, when reported accuracy is equivalent with respect to the highest accuracy reported PAL source and the highest accuracy reported GAA source.

System Embodiment 20 The system of System Embodiment 4, wherein operating (1592) the switch to select a sync source (e.g. best sync source) from among a plurality of alternative reported sync sources includes selecting a GAA source over a WISP source, when reported accuracy is equivalent with respect to the highest accuracy reported GAA source and the highest accuracy reported WISP source.

System Embodiment 21 The system of System Embodiment 4, wherein operating (1592) the switch to select a sync source (e.g., best sync source) from among a plurality of alternative reported sync sources includes selecting a WISP source over a WiFi source, when reported accuracy is equivalent with respect to the highest accuracy reported WISP source and the highest accuracy reported WiFi source.

System Embodiment 22 The system of System Embodiment 4, wherein a WiFi source is only selected as the sync source (e.g., best sync source) when other (non-WiFi) sources (e.g., PAL, GAA, WISP sources) have not been reported.

Numbered List of Exemplary Non-Transitory
Computer Readable Medium Embodiments

Non-Transitory Computer Readable Medium Embodiment 1 A non-transitory computer readable medium (1810) including computer executable instructions which when executed by a processor (1802) of a switch (IDF switch 1800) cause the switch (1800) to perform the steps of: operating the switch (e.g., IDF switch) to receive (1569) a plurality of timing signal accuracy reports, from a plurality of wireless devices (CBSD 1, CBSD 2, CBSD 3, CBSD M), the plurality of timing signal accuracy reports including a first timing signal accuracy report sent from a first wireless device (CBSD 1) and a second timing signal accuracy report sent from a second wireless device (CBSD 2); operating the switch to select (1592 including step 1594) one (CBSD 1) of the wireless devices (CBSD 1, CBSD 2, CBSD 3, CBSDM) from which a timing signal accuracy report was received to act as a timing signal master device; and operating the switch to communicate (1608) an address (e.g., IP address) of the timing signal master device (CBSD 1) to devices (CBSD 2, CBSD 3, CBSD 4, . . . , CBSD M) which use timing synchronization information (e.g., wireless devices and/or other devices).

Non-Transitory Computer Readable Medium Embodiment 2 A non-transitory computer readable medium (1910) including computer executable instructions which when executed by a processor (1902) of a first wireless device (e.g., CBSD 1900) cause the first wireless device (1900) to perform the steps of: operating first wireless device (which is the currently selected the timing signal master device) to generate (1616) sync messages based on timing information received from a selected sync source to be used by the first wireless device (which is the currently selected timing signal master device) for distribution of timing signal information, e.g., to other devices (other CBSDs (which are currently slave devices)) in a campus network, e.g., a campus network including a plurality of wireless devices (e.g., indoor CBSDs) and a switch (e.g., an intelligent IDF switch).

Various embodiments are directed to apparatus, e.g., user devices such as a user equipment (UE) device, CBSDs, e.g., indoor CBSDs, base stations (macro cell base stations and small cell base stations) such as an eNB or gNB or ng-eNB, gateways, e.g. IoT gateway and/or LoRaWAN GWs, WiFi access points (APs), switches, e.g. Intermediate Distribution Frame (IDF) switches and/or Master Distribution Frame (MDF) switches, and network nodes, a Home Subscriber Server (HSS), a Mobility Management Entity (MME), a BM-SC, a MBSFN GW, a MCE, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, CBSDs, e.g., indoor CBSDs, base stations (macro cell base stations and small cell base stations) such as an eNB or gNB or ng-eNB, gateways, e.g. IoT gateway and/or LoRaWAN GWs, WiFi access points (APs), switches, e.g. Intermediate Distribution Frame (IDF) switches and/or Master Distribution Frame (MDF) switches, a Home Subscriber Server (HSS), a Mobility Management Entity (MME), a BM-SC, a MBSFN GW, a MCE, gateways, servers, campus networks, e.g., a CBRS campus network including a plurality of indoor CBSDs and/or other user devices including a wireless receiver, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium. Various embodiments are also directed to local networks, e.g. a campus network including multiple devices including wireless receivers, e.g., CBSDs, corresponding to a single building, portion (floor) of a building, set of building in a closely located area, etc., for which it is desirable to acquire and use a common timing source.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, selecting, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., an indoor device such as a CBSD, a switch, e.g. an intelligent IDF switch or an intelligent MDF switch, an outdoor device such as a cellular base station or GW (IoT GW or LoRaWAN GW) transmitting wireless signal conveying sync information, e.g., into a PAL band a GAA band and/or a WISP band, a NPT server, a HSS server, a MME, a BM-SC, a MME, A MCE, a MBSFN GW, a UE device, an IoT application server, etc., said device including a processor configured to implement one, multiple or all of the steps of one or more methods of the invention.

In some embodiments, the processor or processors, e.g., CPUs, of one or more devices, e.g., communications nodes such as an indoor device such as a CBSD or other user device including a wireless receiver, a switch, e.g. a smart IDF switch or a smart MDF switch, a cellular base station, e.g., supporting transmission of signals conveying synchronization information into one or more bands, e.g. CBRS bands such as PAL bands, GAA bands and/or WISP bands, a NPT server, a HSS server, a MCE, a MME, a UE device, an IoT application server are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a CBSD, e.g., a indoor CBSD which is part of a campus network, an IDF switch which is part of a campus network, an outdoor device such as a cellular base station or GW which is a source of sync information via wireless signals, e.g. broadcast or multicast wireless signals, a HSS server, a MME, a MCE, a UE device, an application server, etc., includes a component corresponding to each of one or more of the steps of the various described methods performed by the device in which the processor is included. In some but not all embodiments a device, e.g., as a CBSD, a user equipment (UE) device, an IDF switch, an outdoor device such as a cellular base station or GW transmitting wireless signals including synchronization information, a NPT server, a HSS server, a MME, a MCE, a UE device, an application server, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, an IDF switch, a MDF switch, a UE, a WiFi AP, an outdoor device such as a cellular base station, e.g., supporting CBRS signaling, a NPT server, a MME, a MCE, a HSS server, a UE device, an application server, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method for providing access to timing information, the method comprising:
    operating a switch to receive a plurality of timing signal accuracy reports, from a plurality of wireless devices, the plurality of timing signal accuracy reports including a first timing signal accuracy report sent from a first wireless device and a second timing signal accuracy report sent from a second wireless device;
    operating the switch to select one of the wireless devices from which a timing signal accuracy report was received to act as a timing signal master device; and
    operating the switch to communicate an address of the timing signal master device to devices which use timing synchronization information.

2. The method of claim 1, further comprising:
    operating the switch to select a sync source from among a plurality of alternative reported sync sources.

3. The method of claim 1, further comprising:
    operating the switch to send a timing master designation message to the selected wireless device which is to act as the timing signal master device.

4. The method of claim 3, wherein said timing master designation message includes information indicating a selected sync source to be used by the timing signal master device for distribution of timing signal information.

5. The method of claim 1, further comprising:
    operating the timing signal master device to generate sync messages based on timing information received from a selected sync source to be used by the timing signal master device for distribution of timing signal information.

6. The method of claim 2, further comprising:
    operating the switch to send a timing master designation message to the selected wireless device indicating that the selected wireless device is the timing signal master device.

7. The method of claim 5, further comprising:
    operating the first wireless device to monitor for wireless signals conveying sync information, said monitoring including monitoring for one or more of: i) evolved Multimedia Broadcast Multicast Service (eMBMS) wireless signals communicating sync information in an IP multicast; ii) WIFI synchronization signals; iii) priority access license (PAL) band synchronization signals; iv) general authorized access band synchronization signals and v) Wireless Internet Service Providers (WISP) signals.

8. The method of claim 5, wherein operating the first wireless device to monitor for wireless signals conveying sync information includes operating the first wireless device to monitor at least three of: i) eMBMS wireless signals communicating sync information in an IP multicast; ii) WIFI synchronization signals; iii) priority access license (PAL) band synchronization signals; iv) general authorized access band synchronization signals and v) Wireless Internet Service Providers (WISP) signals.

9. The method of claim 2, wherein said plurality of timing signal accuracy reports includes a first timing signal accuracy report including: information identifying one or more timing signal sources detected by the first wireless device, said one or more timing signal sources detected by the first wireless device including a first timing signal source, said first timing signal accuracy report including for the first timing signal source one or more of: i) frequency synchronization accuracy information, ii) phase synchronization accuracy information, iii) timing synchronization accuracy information, iv) source protocol information and v) stratum information.

10. The method of claim 9 wherein the first timing signal accuracy report includes at least three of: i) frequency synchronization accuracy information, ii) phase synchronization accuracy information, iii) timing synchronization accuracy information, iv) source protocol information and v) stratum information.

11. The method of claim 9, wherein said first timing signal accuracy report includes: information identifying two or more timing signal sources detected by the first wireless device, said two or more timing signal sources detected by the first wireless device including said first timing signal source and a second timing signal source, said first timing signal accuracy report including for the second timing signal source one or more of: i) frequency synchronization accuracy information, ii) phase synchronization accuracy information, iii) timing synchronization accuracy information, iv) source protocol information and v) stratum information.

12. The method of claim 2, wherein operating the switch to select a sync source from among a plurality of alternative reported sync sources includes selecting a PAL source over a GAA source, when reported accuracy is equivalent with respect to the highest accuracy reported PAL source and the highest accuracy reported GAA source.

13. A system for providing access to timing information, the system comprising:
    a switch including a first processor configured to:
        operate the switch to receive a plurality of timing signal accuracy reports, from a plurality of wireless devices, the plurality of timing signal accuracy reports including a first timing signal accuracy report sent from a first wireless device and a second timing signal accuracy report sent from a second wireless device;

operate the switch to select one of the wireless devices from which a timing signal accuracy report was received to act as a timing signal master device; and operate the switch to communicate an address of the timing signal master device to devices which use timing synchronization information.

14. The system of claim 13, wherein said first processor is further configured to:

operate the switch to select a sync source from among a plurality of alternative reported sync sources.

15. The system of claim 13, wherein said first processor is further configured to:

operate the switch to send a timing master designation message to the selected wireless device which is to act as the timing signal master device.

16. The system of claim 15, wherein said timing master designation message includes information indicating a selected sync source to be used by the timing signal master device for distribution of timing signal information.

17. The system of claim 13, further comprising:

said first wireless device including a second processor, said first wireless device being the selected timing signal master device, and wherein said second processor is configured to:

operate the timing signal master device to generate sync messages based on timing information received from a selected sync source to be used by the timing signal master device for distribution of timing signal information.

18. The system of claim 14, wherein said first processor is configured to:

operate the switch to send a timing master designation message to the selected wireless device indicating that the selected wireless device is the timing signal master device.

19. The system of claim 17, wherein said second processor is configured to:

operate the first wireless device to monitor for wireless signals conveying sync information, said monitoring including monitoring for one or more of: i) evolved Multimedia Broadcast Multicast Service (eMBMS) wireless signals communicating sync information in an IP multicast; ii) WIFI synchronization signals; iii) priority access license (PAL) band synchronization signals; iv) general authorized access band synchronization signals and v) Wireless Internet Service Providers (WISP) signals.

20. A non-transitory computer readable medium including computer executable instructions which when executed by a processor of a switch cause the switch to perform the steps of:

operating the switch to receive a plurality of timing signal accuracy reports, from a plurality of wireless devices, the plurality of timing signal accuracy reports including a first timing signal accuracy report sent from a first wireless device and a second timing signal accuracy report sent from a second wireless device;

operating the switch to select one of the wireless devices from which a timing signal accuracy report was received to act as a timing signal master device; and operating the switch to communicate an address of the timing signal master device to devices which use timing synchronization information.

* * * * *